US011061864B2

(12) United States Patent
Layton et al.

(10) Patent No.: US 11,061,864 B2
(45) Date of Patent: Jul. 13, 2021

(54) CLUSTERED NETWORK FILE SYSTEM SERVER RECLAIM VIA DECENTRALIZED, COORDINATED GRACE PERIOD

(71) Applicant: Red Hat, Inc., Raleigh, NC (US)

(72) Inventors: Jeffrey Thomas Layton, Raleigh, NC (US); Gregory Allan Farnum, Los Angeles, CA (US); Zheng Yan, Shanghai (CN); Patrick Joseph Donnelly, Sacramento, CA (US)

(73) Assignee: Red Hat, Inc., Raleigh, NC (US)

( * ) Notice: Subject to any disclaimer, the term of this patent is extended or adjusted under 35 U.S.C. 154(b) by 320 days.

(21) Appl. No.: 16/046,630

(22) Filed: Jul. 26, 2018

(65) Prior Publication Data

US 2020/0034450 A1 Jan. 30, 2020

(51) Int. Cl.
*G06F 15/16* (2006.01)
*G06F 16/17* (2019.01)
*G06F 16/182* (2019.01)

(52) U.S. Cl.
CPC ........ *G06F 16/1727* (2019.01); *G06F 16/182* (2019.01)

(58) Field of Classification Search
None
See application file for complete search history.

(56) References Cited

U.S. PATENT DOCUMENTS

| 6,775,703 | B1 | 8/2004 | Burns et al. |
| 7,124,131 | B2 | 10/2006 | Guthridge et al. |
| 7,356,531 | B1* | 4/2008 | Popelka ............ G06F 11/2028 707/682 |
| 7,634,517 | B1* | 12/2009 | Burrows ............ G06F 16/316 |
| 8,126,843 | B2 | 2/2012 | McKenney et al. |
| 8,533,158 | B1* | 9/2013 | Rao .................. G06F 3/0608 707/646 |
| 10,120,759 | B1* | 11/2018 | Gv .................. G06F 11/1438 |
| 2016/0110403 | A1* | 4/2016 | Lomet .............. G06F 16/2322 707/695 |

* cited by examiner

*Primary Examiner* — Alex Gofman
(74) *Attorney, Agent, or Firm* — K&L Gates LLP

(57) ABSTRACT

A system includes a plurality of clustered servers, a plurality of clients communicating with the plurality of clustered servers, and a grace database. Each of the plurality of clustered servers maintains a respective client recovery list. A client of the plurality of clients is configured to send a reclaim request to a server of the plurality of clustered servers. The grace database is configured to maintain an epoch value and a reclaim value. The epoch value indicates the current epoch, and the reclaim value indicates from which epoch reclaim is allowed. The server of the plurality of clustered servers is configured to maintain a client list and receive the reclaim request from the client. The client list indicates each client currently holding state on the server.

17 Claims, 11 Drawing Sheets

CLUSTERED NETWORK FILE SYSTEM SERVER RECLAIM VIA DECENTRALIZED, COORDINATED GRACE PERIOD

BACKGROUND

Cloud computing defines a model for enabling ubiquitous, convenient, on-demand network access to a shared pool of configurable computing resources (e.g., networks, servers, storage, applications, and services). For example, a server may remotely store data, which may be accessed by various clients that establish leases with the servers. Several servers may be organized in a server cluster and may communicate with their respective clients on the clustered server system. The clients establish ephemeral states based on which files the clients have open, locks held by the clients, specific delegations, layouts, etc.

In cloud computing, computing resources may crash or need to restart. For example, a server in a server cluster may reboot due to scheduled maintenance or because of an unscheduled system failure. When the server crashes, each client may lose their ephemeral state and may need to reestablish their state with the server.

SUMMARY

The present disclosure provides new and innovative systems and methods for clustered server reclaim via a grace period. In an example, a system includes a plurality of clustered servers, a plurality of clients communicating with the plurality of clustered servers, and a grace database. Each of the plurality of clustered servers maintains a respective client recovery list. A client of the plurality of clients is configured to send a reclaim request to a server of the plurality of clustered servers. The grace database is configured to maintain an epoch value and a reclaim value. The epoch value indicates the current epoch, and the reclaim value indicates from which epoch reclaim is allowed. The server of the plurality of clustered servers is configured to maintain a client list and receive the reclaim request from the client. The client list indicates each client currently holding state on the server.

In an example, a method includes receiving, by a server, a reclaim request from a client. The server is part of a server cluster. There server compares the reclaim request against a client list, classifies the reclaim request as either allowed or restricted, and determines a first status of a grace period as either in effect and inoperative. Responsive to determining the first status of the grace period as inoperative, the server changes the first status of the grace period to in effect. Responsive to determining the first status of the grace period as in effect, the server signals that the server needs a reclaim period.

In an example, a method includes maintaining, by a database, an epoch value and a reclaim value. The epoch value indicates the current epoch, and the reclaim value indicates from which epoch reclaim is allowed. Additionally, the method includes, responsive to a server reboot, querying, by a server of a server cluster, the epoch value and the reclaim value to determine a cluster status of the cluster as either in recovery or in normal operation. Responsive to determining the status as in recovery the server allows a client to reclaim a previous operational state. Responsive to determining the status as in normal operation, the server prevents the client from reclaiming the previous operational state. The method also includes tracking, by the database, a set of flags associated with each server of the server cluster.

The server queries the database for a flag status of each server and classifies the flag status as either completed reclaim or pending reclaim. Responsive to classifying the flag status as completed reclaim, the server edits the reclaim value in the database to change the cluster status to in normal operation. Responsive to classifying the flag status as pending reclaim, the server enforces the grace period.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1A:
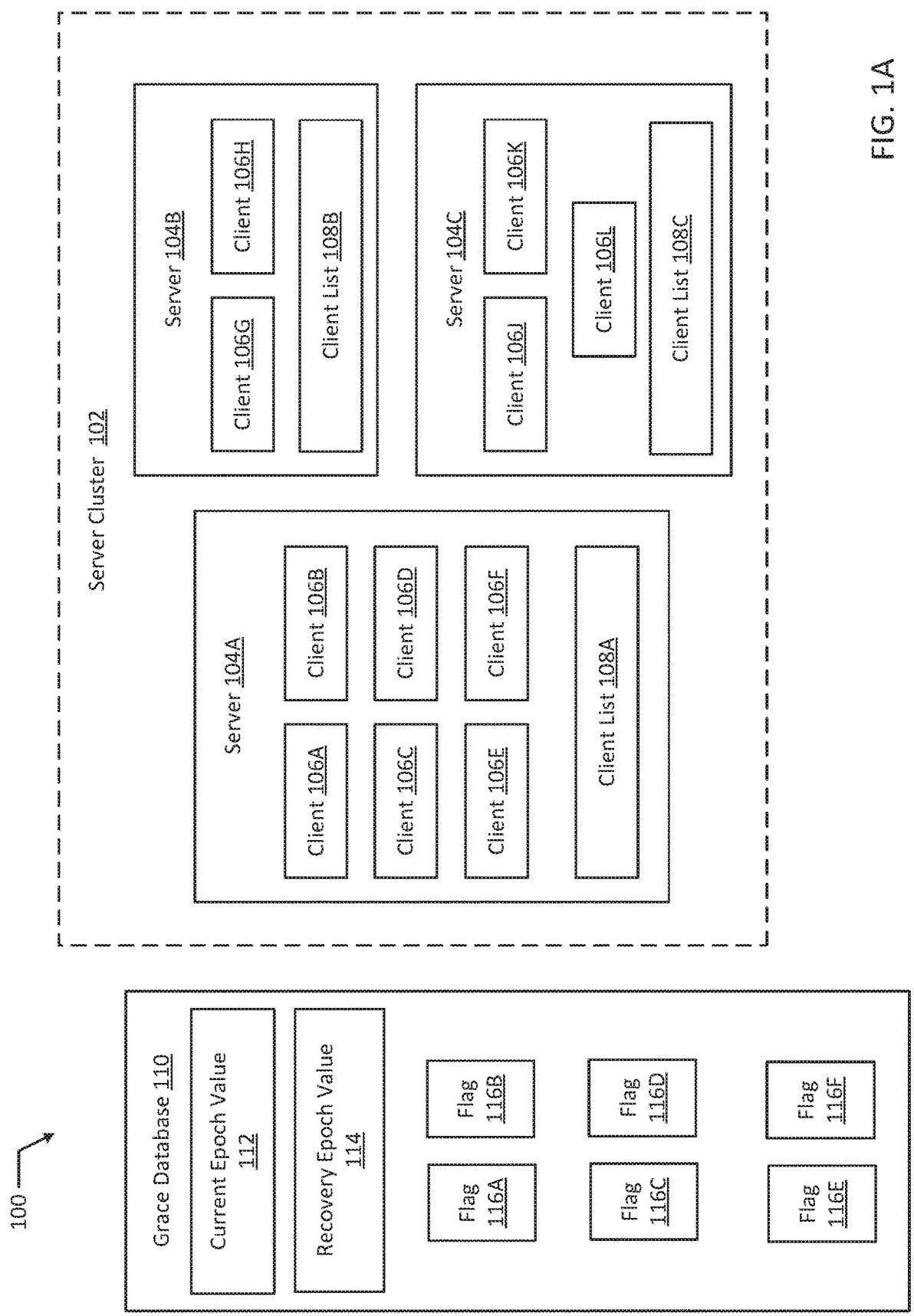
FIG. 1A illustrates a block diagram of an example clustered server system according to an example embodiment of the present disclosure.

Techniques are disclosed for clustered network file system ("NFS") server reclaim via a decentralized, coordinated grace period. For example, the techniques disclosed may be used when reclaiming client state after a NFS server restarts or joins a server cluster. When handling network traffic (e.g., network traffic from a cloud computing platform such as the Red Hat® OpenStack® Platform), NFS server providers such as the Red Hat® GFS (Global File System), which includes the Red Hat Cluster Suite, may attempt to improve server reclaim to allow clustered server systems to be scaled for different use cases while reducing overhead and preventing clients from holding conflicting states after server reboot.

Network File Systems use protocols such as NSFv4, which is a lease-based protocol for remote storage. However, implementing a distributed Network File System ("NFS") server poses problems, particularly in failure scenarios. For example, in a clustered NFS server, a central tenet to ensure that the distributed system works properly is to ensure that a server does not hand out conflicting states to clients. Specifically, any open file, file lock, delegation or layout that an NFS server grants to a client must not conflict with anything (e.g., file, lock, delegation or layout) held by other active NFS clients. The above tenet also applies when the NFS server that granted the client's state is restarting.

One way to properly maintain a distributed NFS server cluster is to track all of the state information for each client in a central storage system. By keeping all of the state information in a central storage system, continuity of the server cluster may be maintained after a server crash. However, tracking and storing all of the state information in a central storage system is a heavyweight solution (e.g., requires a robust centralized storage) where each and every open file, lock, etc. must be logged. Typically, all of the state data logged in the centralized storage is transferred out-of-band from the filesystem itself. Out-of-band data transfers are transferred through a stream that is independent from the main in-band data stream (e.g., data stream that may use common protocols and use the network itself), which adds additional overhead.

Singleton NFS servers maintain states by providing clients a period of time to reissue requests to reclaim their state that the client previously held after the server is restarted. During this reclaim period, the NFS server will not grant any requests for new state. Eventually, the server will lift the grace period and allow normal operation at which point new state requests are allowed and reclaims are denied. For example, after restarting an NFS server, the server may come up with no ephemeral state and may allow clients to reclaim state that the clients held earlier for approximately two lease periods.

When extending the concepts used for Singleton NFS servers to distributed NFS server clusters, the resources used for state tracking for a singleton server is amplified due to the additional servers in the server cluster. As mentioned before, detailed state tracking on stable storage is quite computationally expensive. However, with a distributed NFS server cluster, each server must coordinate grace periods and any associated reclaim requests with each server in the server cluster.

For example, when a server node crashes, the clustered NFS servers must coordinate the grace period across the whole cluster and the grace period must be imposed prior to any server in the cluster handing out any state that could potentially conflict with another client or client state on the cluster. In practical terms, the grace period must be imposed before the server node's previous session on the underlying storage expires. Typically, this involves a controlling entity to act as a master, which flips all of the servers into the grace period. At the end of the grace period, the master controlling entity or master controller lifts the grace period on all of the nodes. However, the master controller is a single point of failure, which may cause the entire server cluster to fail resulting in each client losing its ephemeral state if the controller malfunctions. Additionally, there is significant overhead associated with timing the grace period switches for large server clusters.

If an NFS server crashes and is restarted, there is a window of time that that NFS server does not know what state was held by its clients. If the state held by the crashed NFS server is immediately released after the crash, another NFS server could hand out conflicting state before the original NFS client has a chance to recover its state. The server reclaim system and methods disclosed herein prevent servers from handing out conflicting state information by ensuring that each server in the server cluster is enforcing the grace period prior to releasing a state held by the server. For example, the present disclosure advantageously enables an NFS server to determine when it is safe to release state held by a previous instance of itself.

As described in the various example embodiments disclosed herein, a server reclaim system allows a set of largely independent NFS servers to run in front of a clustered filesystem while limiting the interactions between the servers and eliminating a single point of failure. In the example embodiments, each server maintains a list on stable storage, where the list identifies clients that are allowed to reclaim previous ephemeral states. For example, the server may make a record of the clients prior to handing out the first open (e.g., allowing a client to open or access data), and the server may remove the record after the client performs its last close, which is much less costly than tracking all the client states on stable storage. If a stable storage record does not already exist, the server may set a stable storage record, associated with the current epoch, for the client prior to the client performing its first open (e.g., opening or accessing data) (whether during reclaim or during normal operations). An epoch describes a lifecycle of a server in a server cluster, and each transition of the server cluster from recovery to normal operation is its own epoch (e.g., a first epoch followed by a second epoch, which is followed by a third epoch and so on). In addition to removing the stable storage record after the last file is closed, the server may also remove the storage record when the client state expires. Just prior to ending a grace period, the server may atomically replace old recovery databases with a new recovery database that includes client information for the present epoch. For example, after transitioning from a grace period to normal operations, the server may delete any previous epoch's database (e.g., any recovery database and/or client list associated with a previous epoch).

To achieve atomicity in a distributed fashion in clustered configurations, each reboot of an NFS server is considered to be the start of an epoch. For example, the initial boot of an NFS server is Epoch_1, at the beginning of the next reboot, Epoch_2, etc. Each established epoch is established cluster-wide or across the cluster. For example, each server in the server cluster coordinates such that it is operating at the appropriate epoch and maintains lists of clients in each respective server's recovery database associated with the appropriate epoch. After reboot, client reclaim requests are compared against the list of clients from the previous epoch. Before handing out any state (e.g., new state or reclaimed state), the server establishes a record in the database associated with the current epoch. For example, each state handed out during Epoch_2 results in the server making a record of the client in the client list associated with Epoch_2 on stable storage (e.g., in a recovery database associated with the server). The recovery database may be tagged with epoch information and node information, for example by user a ServerID or NodeID "N" and an epoch "E".

When an NFS server node restarts or comes up, the server determines whether a cluster-wide grace period is in effect, and if so, from what epoch recovery is allowed. In the example embodiments disclosed herein, the server may advantageously discover epoch information (e.g., current epoch value and a recovery epoch value) without relying on a single, controlling entity or master controller.

A grace database is stored on stable storage and maintains the current epoch and grace period information. The grace database may indicate whether a cluster-wide grace period is in effect, what the current epoch is, and from what epoch recovery is allowed. For example, the database may contain two unsigned, 64-bit integers "C" and "R", where "C" identifies the current epoch value and where "R" identifies the reclaim epoch value or recovery epoch value to indicate from which epoch reclaim is allowed. When "R" is assigned a value of zero, that may signify that no reclaim is allowed.

When the NFS server node restarts or comes up, it queries these values from the grace database and can instantly determine whether a grace period is in effect and what the current epoch is. If R=0, then no reclaim is allowed, meaning that there is no cluster-wide grace period. If R≠0 (e.g., R=1, R=2, R=3, etc.), then the server may allow reclaim for the epoch indicated by the recovery epoch value "R". During the grace period, the servers allow existing clients to reclaim their state, block existing clients from establishing a new state, and block new clients from establishing a state. By blocking or barring new clients from establishing a state (e.g., clients that were not present after the previous reboot) and barring existing clients from acquiring a new state during the grace period (or recovery period), the system advantageously avoids clients holding conflicting states, which is especially problematic in systems utilizing network partitions.

The grace database also tracks a set of flags (e.g., one set per server or node) to indicate that the particular server or node in the server cluster either requires a grace period or is enforcing a current grace period. As each server or node joins the cluster, the server sets a need_grace flag if it is going to allow reclaim from its respective clients. Each server in the server cluster may monitor the grace database, which in turn ensures that each local reclaim period serves as an atomic transaction. The atomicity of the system prevents servers from handing out conflicting state information. Additionally, the server may set an enforcing flag to indicate that it is also enforcing the grace period. Once a server completes its own reclaim period, the server clears the need_grace flag. If the server is the last server or node to clear its need_grace flag, then the server will atomically (e.g., with atomicity) lift the cluster-wide grace period by setting R=0 while clearing both the need_grace flag and the enforcing flag. By ensuring that each server node is enforcing the grace period until the grace period is no longer needed by any node, the system advantageously allows each node to join the in-progress grace period and also allows each server (or node) to declare when the server no longer needs the grace period. Furthermore, if a server (or node) crashes while a cluster-wide grace period is in effect, the system advantageously allows the server to rejoin the server cluster and achieve reclaim prior to the server-cluster transitioning to normal operations.

In an example, when establishing a new grace period, the initiator (e.g., server initiating the grace period), may set respective "need_grace" flags for each of the other servers (or nodes) in the server cluster. By setting "need_grace" flags for each server in the server cluster, the system may advantageously prevent potential races where a node may end up lifting the cluster-wide grace period prior to other servers having a chance to join. Additionally, once a grace period is initiated, the present disclosure advantageously allows servers (or nodes) to join the grace period while the grace period is in force, even if the server is not part of an initial set of nodes.

The present disclosure provides a mostly decentralized server reclaim system for clustered servers that is tolerant of server (or node) failures that occur while the cluster is in recovery. Additionally, the present disclosure allows clustered NFS server reclaim that is decentralized where servers and their associated recovery databases are atomically switched independently by each server, which allows the system to be scaled. In other systems where all of the state information in a central storage system, perhaps in the same object, is disadvantageous for scalability because each of the servers and/or respective clients may be accessing, reading, or writing to the same database object on every open, causing the system to slow down and possibly crash. Since each server switches its recovery database independently and locally performs a grace period, the present disclosure eliminates a single point of failure that exists in systems that use a master controller.

FIG. 1A depicts a high-level component diagram of an example clustered server system 100 in accordance with one or more aspects of the present disclosure. The clustered server system 100 may include a server cluster 102 with a plurality of servers 104A-C and a grace database 110. The grace database 110 may be shared storage that each of the servers 104A-C can access.

Each of the servers 104A-C in the server cluster 102 may communicate with clients 106A-L. For example, clients 106A-F may have a relationship (e.g., established leases) with server 104A, clients 106G-H may have a relationship (e.g., established leases) with server 104B, and clients 106J-L may have a relationship (e.g., established leases) with server 104C. Each server 104A-C of the server cluster 102 may be serving out content from a clustered backend filesystem. The filesystem may ensure that the NFS servers 104A-C cannot obtain state that conflicts with that of another NFS server. An example filesystem is the Ceph Filesystem ("Ceph FS"), which is a cluster-coherent portable operating system interface ("POSIX") filesystem. Additionally, an example NFS server is a nfs-ganesha server, which is a user-mode NFS server.

The clients 106A-L may interact with the servers 104A-C or nodes. Each client 106A-L may in turn include one or more physical processors (e.g., CPU 120A-L) communicatively coupled to memory devices (e.g., MD 130A-L) and input/output devices (e.g., I/O 140A-L). Each client 106A-L may be a computer, such as a physical machine and may include a device, such as hardware device. In an example, a hardware device may include a network device (e.g., a network adapter or any other component that connects a computer to a computer network), a peripheral component interconnect ("PCI") device, storage devices, disk drives, sound or video adaptors, photo/video cameras, printer devices, keyboards, displays, etc.

As used herein, physical processor or processor 120A-L refers to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-L refers to a volatile or non-volatile memory device, such as RAM, ROM, EEPROM, or any other device capable of storing data. As discussed herein, I/O device 140A-L refers to a device capable of providing an interface between one or more processor pins and an external device capable of inputting and/or outputting binary data.

Processors 120A-L may be interconnected using a variety of techniques, ranging from a point-to-point processor interconnect, to a system area network, such as an Ethernet-based network. Local connections within each node, including the connections between a processor 120A-L and a memory device 130A-L may be provided by one or more local buses of suitable architecture, for example, peripheral component interconnect ("PCP").

Figure 1B:
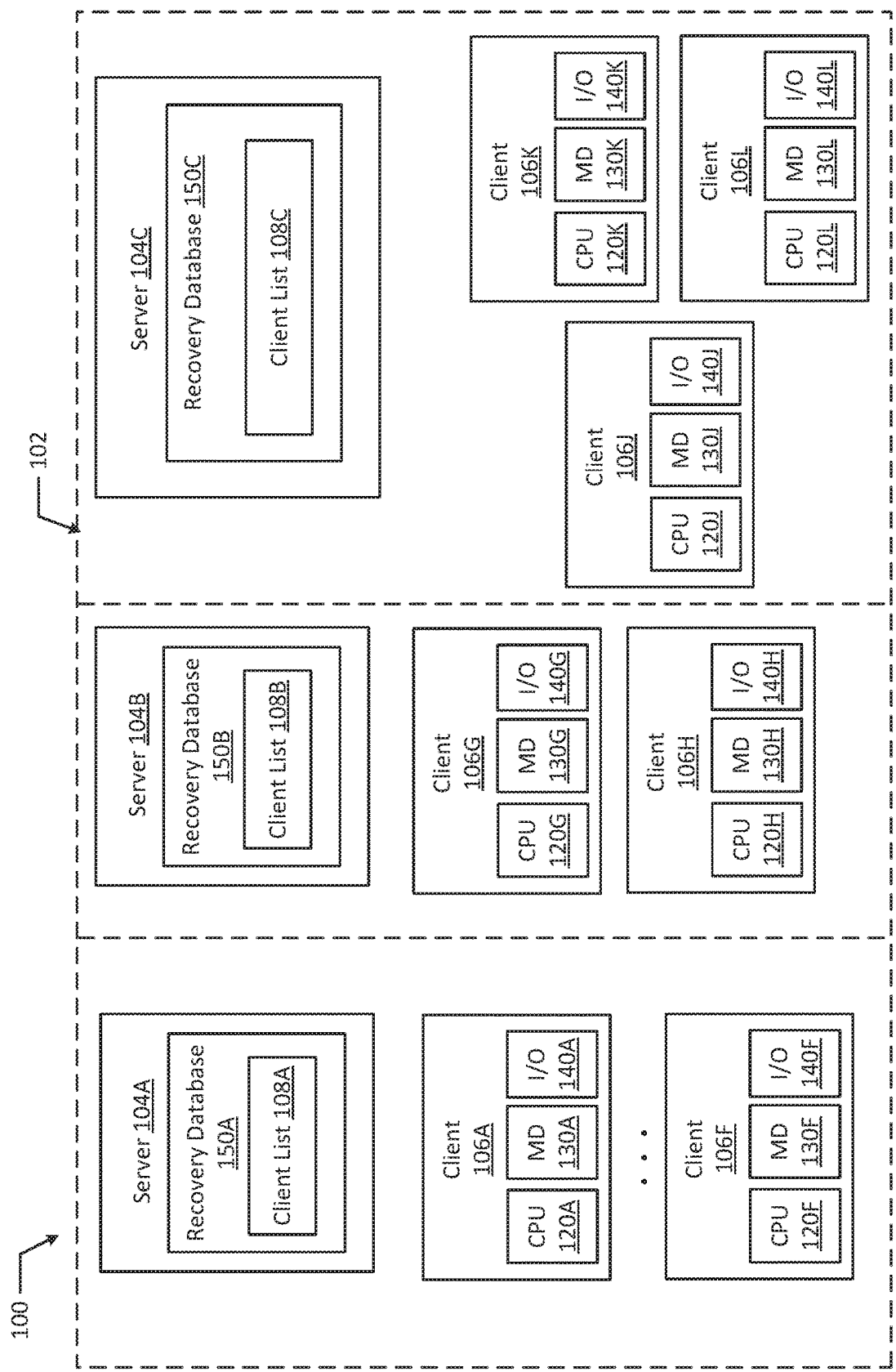
FIG. 1B illustrates a block diagram of an example clustered server system according to an example embodiment of the present disclosure.

Each server 104A-C may maintain a client list 108A-C respectively. As illustrated in FIG. 1B, servers may maintain client lists 108A-C on recovery databases 150A-C. In an example, the client lists 108A-C may be maintained for each epoch. As a new epoch is established, the server may create a new client list associated with that epoch. For example, as clients (e.g., clients 106A-F) come in to reclaim, the server (e.g., server 104A) may establish records for the new clients 106A-F in a new recovery database (e.g., recovery database 150A) associated with the current epoch. Once the new client list 108A-C has been established, old versions of the client list 108A-C may be deleted. For example, after a new epoch is established (e.g., clustered server system transitions from Epoch_1 to Epoch_2), the servers 104A-C may finalize their client lists 108A-C for Epoch_2 and delete the client lists associated with Epoch_1.

The transition from recovery (e.g., a grace period) to normal operation may trigger an atomic switch of the recovery database 150-C and/or the client lists 108A-C. For example, a new recovery database 150A-C and/or client list 108A-C may become legitimate on a recovery to normal transition. Until the new recovery database 150A-C and/or client list 108A-C is legitimized, the recovery database 150A-C associated with the previous epoch may be considered the canonical database. Once the new database 150A-C and/or client list 108A-C is legitimized, databases or lists associated with the previous epoch may be deleted. Recovery databases 150A-C may be stored as Reliable Autonomic Distributed Object Store ("RADOS") objects. Additionally each recovery database 150A-C may be given a name that has the current epoch embedded in the name, which advantageously ensures that the recovery databases 150A-C are specific to a particular epoch.

Grace database 110 associated with the server cluster 102 may maintain a current epoch value 112 and a recovery epoch value 114. Additionally, grace database 110 may maintain flags (e.g., flags 116A-F) associated with each server 104A-C of the server cluster 102. For example, flags 116A-B may be associated with server 104A, flags 116C-D may be associated with server 104B, and flags 116E-F may be associated with server 104C. A server may set a flag in the grace database 110 to indicate that the server needs a grace period. Additionally, a server may set a flag in the grace database 110 to indicate that the server is enforcing a grace period.

In another example, an object map key-value store may track the state of each server 104A-C in the server cluster 102. A key may be the server's hostname and the value associated with the key may be a byte with the lower two bits used as flags. For example, if a server may indicate it needs grace ("N") or that the server is enforcing grace ("E"). In an example (N=0x1) and (E=0x2).

Server 104A may set flag 116A in grace database 110 to indicate that it needs a grace period and may also set flag 116B to indicate that the server 104A is enforcing the grace period. Similarly, server 104B may set flags 116C-D and server 104C may set flags 116E-F to indicate that the respective server (e.g., servers 104B-C) needs a grace period and/or is enforcing a grace period respectively.

The grace database 110 may be a single, shared database object. In an example, similar to recovery databases 150A-C, the database object may be a RADOS object. RADOS is a distributed object store with clusters of object storage daemons. Clients may batch sets of read and write operations that can be executed atomically. Each object of a RADOS object store may include unstructured data, extended attributes ("xattrs") and an object map ("omap"). Typically, omaps are far less expensive to access, so it is more efficient to use an omap than a data field to store small entries. Xattrs are extensible mechanisms to store metadata along files. For example, an xattr may describe some additional properties of the file, typical metadata is often limited to ownership information and dates (e.g., access date), but xattrs allow more information to be stored about a file.

Since RADOS operations are atomic, data and omap reads and writes are also atomic. Servers 140A-C may perform read operations, modify operations, and write operations on the RADOS object. The write may assert on object version and may try again if assertion fails. In an example, the "R" and "C" values may be stored in unstructured data in the shared grace object.

In an example, an omap may be used to track which nodes need the grace period. For example, a key or text representation of the NodeID may be used. A node may set the key to join the grace period and may remove the key to indicate that a grace period is no longer needed for that node. The grace database 110 may be initialized with R=0, C=1, and no keys. When starting a new epoch, the omap keys may be set for starting set of NodeIDs, R=C an C=C+1. As nodes or servers come up, they set omap key of grace period is still in force. By setting the omap key, the server is allowed to rejoin a grace period even if the server crashes during the grace period. When a server successfully comes up, the server loads the recover database 110 for the epoch identified by "R". As a server (or node) finishes its own reclaim, the server removes its own omap key. The last node to remove its omap key lifts the grace period by setting R=0. The server may remove its omap key and set R=0 in the same operation. As nodes notice that R=0, the nodes may stop enforcing the local grace period.

Figure 2A:
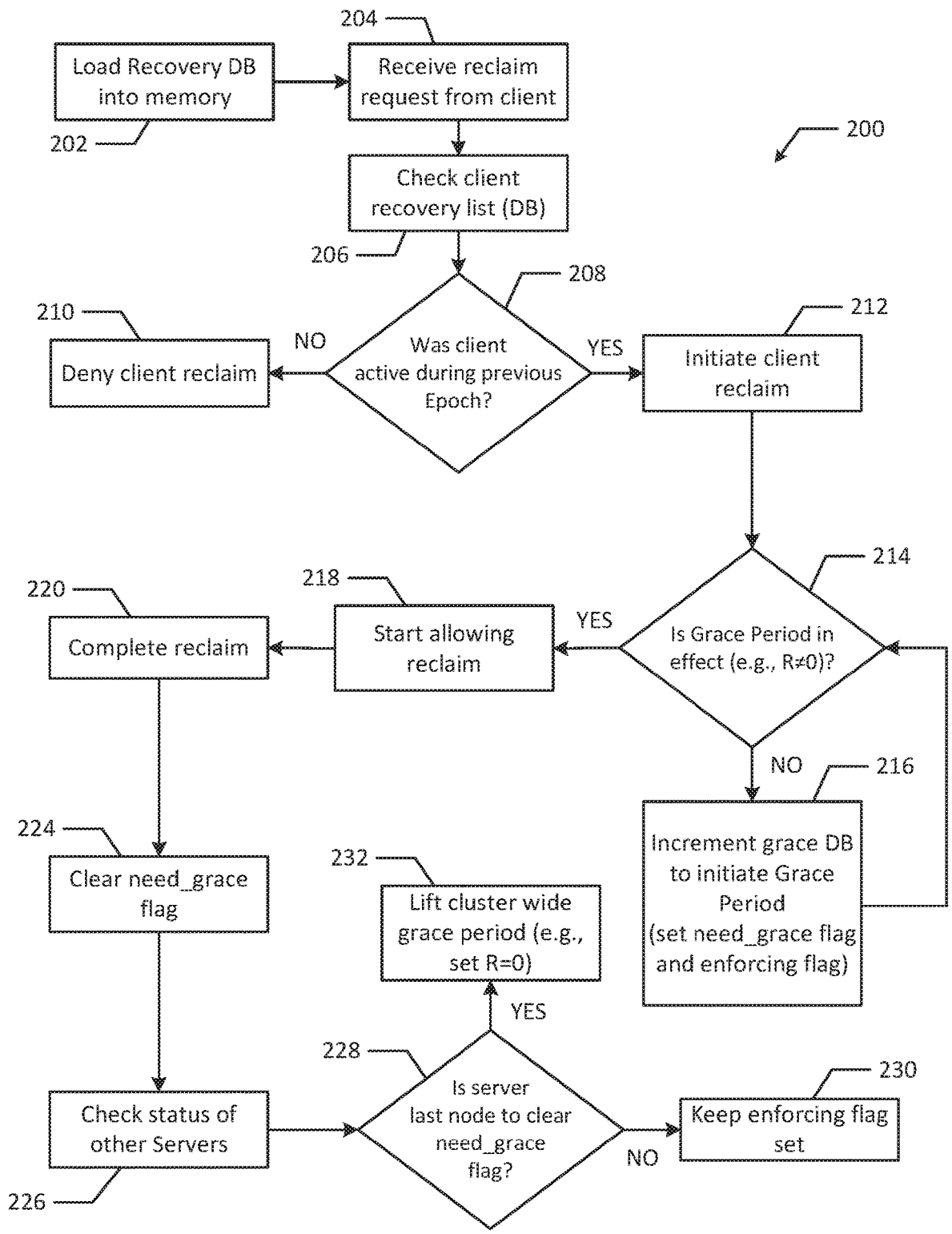
FIG. 2A illustrates a flowchart of an example process for server reclaim for a restarting server according to an example embodiment of the present disclosure.

FIG. 2A illustrates a flowchart of an example process 200 for server reclaim for a restarting server (or node). It will be appreciated that many other methods of performing the acts associated with the process 200 may be used. For example, the order of some of the blocks may be changed, certain blocks may be combined with other blocks, one or more of the blocks may be repeated, and some of the blocks described are optional. After a server (e.g., server 104A, generally referred to as server 104) restarts, the server 104 may load its respective recovery database (e.g., recovery database 150A, generally referred to as recovery database 150) into memory (block 202). Then, the server 104 may receive a reclaim request from a client (e.g., client 106A, generally referred to as client 106) (block 204). For example, a client 106 may detect that the server 104 has restarted and may send a reclaim request to the client 106 to regain its ephemeral state, or state that the client 106 had prior to the server 104 crashing and restarting. The ephemeral state may represent which files the client had open, which locks the client was currently holding, and/or any delegations and layouts associated with the client.

After receiving the reclaim request, the server 104 may check the client recovery list (e.g., client list 108A, generally referred to as client list 108) from the recovery database 150 (block 206). When checking the client list 108, the server 104 determines whether the client was active during the previous epoch (block 208). For example, the client list 108 may indicate which clients 106 were operating during the previous epoch and thus allow the server to deny the reclaim request (block 210) if the client 106 was not operating during the last epoch or initiate the reclaim request (block 212) if the client was operating during the last epoch. By only allowing clients that had established states with the server 104 to reclaim their state, the system prevents clients from obtaining conflicting states, which would likely cause applications running on the NFS clients to crash (e.g., when exclusion guarantees or locks are not properly enforced) or in some cases may cause the distributed server system to crash.

After initiating client reclaim, the server 104 may determine if a grace period is in effect (block 214). For example, the server 104 may query a grace database 110 to determine a current epoch value 112 ("C") and/or a recovery epoch value 114 ("R"). In an example, the grace database may indicate that a grace period is in effect when the recovery epoch value 114 or "R" is a non-zero value or a non-NULL value. For example, R=1 may indicate that a grace period is in effect with reclaim allowed from Epoch_1, R=2 may indicate that a grace period is in effect with reclaim allowed from Epoch_2, R=3 may indicate that a grace period is in effect with reclaim allowed from Epoch_3, and so on. Alternatively, R=0 may indicate that a grace period is not in effect and thus reclaim is not allowed for any clients attempting to establish a server lease with a server 104 in the server cluster 102.

If a grace period is not in effect, the server 104 may increment the values in the grace database 110 to initiate a grace period (block 216). For example, the server 104 may increment the current epoch value 112 (e.g., C=C+1 or C=2 if the previous epoch was Epoch_1) and set the recovery epoch value 114 (e.g., R=1) to indicate that the client has requested to reclaim its state from Epoch_1. When initiating a grace period, the server 104 may also set a need_grace flag (e.g., flag 116A) and an enforcing flag (e.g., flag 116B). When the grace database 110 is updated with a new "C" or "R" value, each server 104 (or node) may be informed of the update so that the servers 104 in the server cluster 102 can take appropriate action. The "need_grace" flag and the "enforcing" flags allow each server 104 (e.g., server 104A) to advertise its state to other servers (e.g., servers 104B-C) in the server cluster 102 so that each server 104 can determine whether another server 104 in the server cluster 102 has any clients from the previous epoch that will require recovery and whether a server is preventing clients from acquiring a new state (e.g., whether the server is enforcing the grace period).

The server may also initiate the grace period after the server 104 restarts and prior to receiving a reclaim request. Specifically, the flowchart of the example process 200 may start with block 214, where the server 104 starts and checks if a grace period is in effect and then initiates a grace period if necessary. For example, after a server 104 starts, the server 104 may quickly initiate a grace period to prevent other servers 104 from handing out conflicting state information. By entering a grace period as soon as possible, the server 104 may advantageously reduce the amount of time other servers 104 have to hand out state information before entering a grace period. Once the grace period is established, each server 104 of the server cluster 102 enforces the grace period to ensure that the appropriate clients 106 can reclaim their lost states without other clients 106 acquiring new states that may conflict with the lost states.

If a grace period is already in effect, the server 104 may start allowing reclaim for the client 106 that sent the reclaim request along with any other client 106 requesting reclaim that is listed on the server's 104 recovery database 150 (block 218). In an example, the server 104 may wait for all other clustered servers to indicate that they are enforcing the grace period, for example, by checking to see if all the other servers 104 "enforcing" flags are set. Then at startup, the server 104 may load exports and kill off any state held by a previous incarnation of the server 104. After some time, the server 104 may complete reclaim (block 220). For example, the server 104 may process reclaim requests for each client 106 listed in the client list 108 on the recovery database 150. After completing reclaim, the server 104 may clear the "need_grace" flag (e.g., flag 116A) on grace database 110 (block 224). For example, once the server 104 expects no more reclaim requests from any clients 106 either due to the grace period timing out or all of the clients reporting that they have completed reclaiming state, then the server 104 may clear the "need_grace" flag. Then, the server 104 (e.g., server 104A) may check the status of other servers 104 (e.g., servers 104B-C) in the server cluster 102 (block 226). In an example, the server 104A may check the status of the other servers 104B-C in the server cluster 102 by querying grace database 110 and reviewing the flags that are set and maintained by the grace database 110. For example, the server 104A may determine whether other servers 104B-C within the server cluster 102 still need a grace period (e.g., have their "need_grace" flags set) or whether the other servers 104B-C are enforcing the grace period (e.g., have their "need_grace" flag cleared and have their "enforcing" flag set).

The server 104A determines if it is the last node to clear its "need_grace" flag (block 228). If server 104A is not the last server to clear its respective "need_grace" flag (e.g., either server 104B or 104C still has a "need_grace" flag set), then server 104A will keep its respective "enforcing" flag set (block 230). If server 104A is the last server 104 or node to clear its respective "need_grace" flag (e.g., all other nodes in the cluster 102 have "enforcing" flags set and all other "need_grace" flags are cleared), then server 104A will lift the cluster wide grace period by setting the recovery epoch value 114 back to zero (block 232). Once the grace period is lifted, each of the servers 104A-C may clear their respective "enforcing" flags. The current epoch value 112, recovery epoch value 114, and flags 116A-F may be stored in a single RADOS object that is modified using read/modify/write cycles. In an example, a server (e.g., server 104A) may read the whole object, modify the object, and then attempt to write the object back. If something changes between the read and write (e.g., setting a flag, clearing a flag, etc.), the server 104 may redo the read and try modifying and writing the object back again.

The present disclosure advantageously allows clients 106 to reclaim states without requiring other servers 104 (e.g., servers 104B-C) in the server cluster 102 to restart. Instead, recovery may be achieved by having other servers 104 (e.g., servers 104B-C) in the server cluster 102 to start enforcing the grace period after the grace period is initiated. Once the grace period is initiated, the clustered servers 104 are no longer independent as the grace period is a cluster-wide property. When all of the servers 104 in the server cluster 102 are enforcing the grace period, the recovering server 104

(e.g., server 104A) can then request the filesystem to release the old state, and allow clients 106 to being reclaiming their respective ephemeral states. In an example, server startup may be stalled until all of the other servers 104 (e.g., servers 104B-C) in the server cluster 102 are enforcing the grace period.

A clustered NFS server lifecycle may include a "Start" period when the server 104 (e.g., server 104A) comes up and waits for other servers 104 (e.g., servers 104B-C) to enforce the grace period, a "Recovery" period when the server 104 allows clients to recover their state, an "Enforce" period where the server 104 is no longer allowing recovery, but is still enforcing the grace period, a "Normal" period where the server 104 operates normally and allows clients to acquire new states (e.g., after the grace period has ended), a "Re-enforce" period where the server 104 prepares to enforce again (e.g., after another server 104B initiates a grace period), and a "Shutdown" period where the server 104 may prepare for an eventual restart.

Figure 2B:
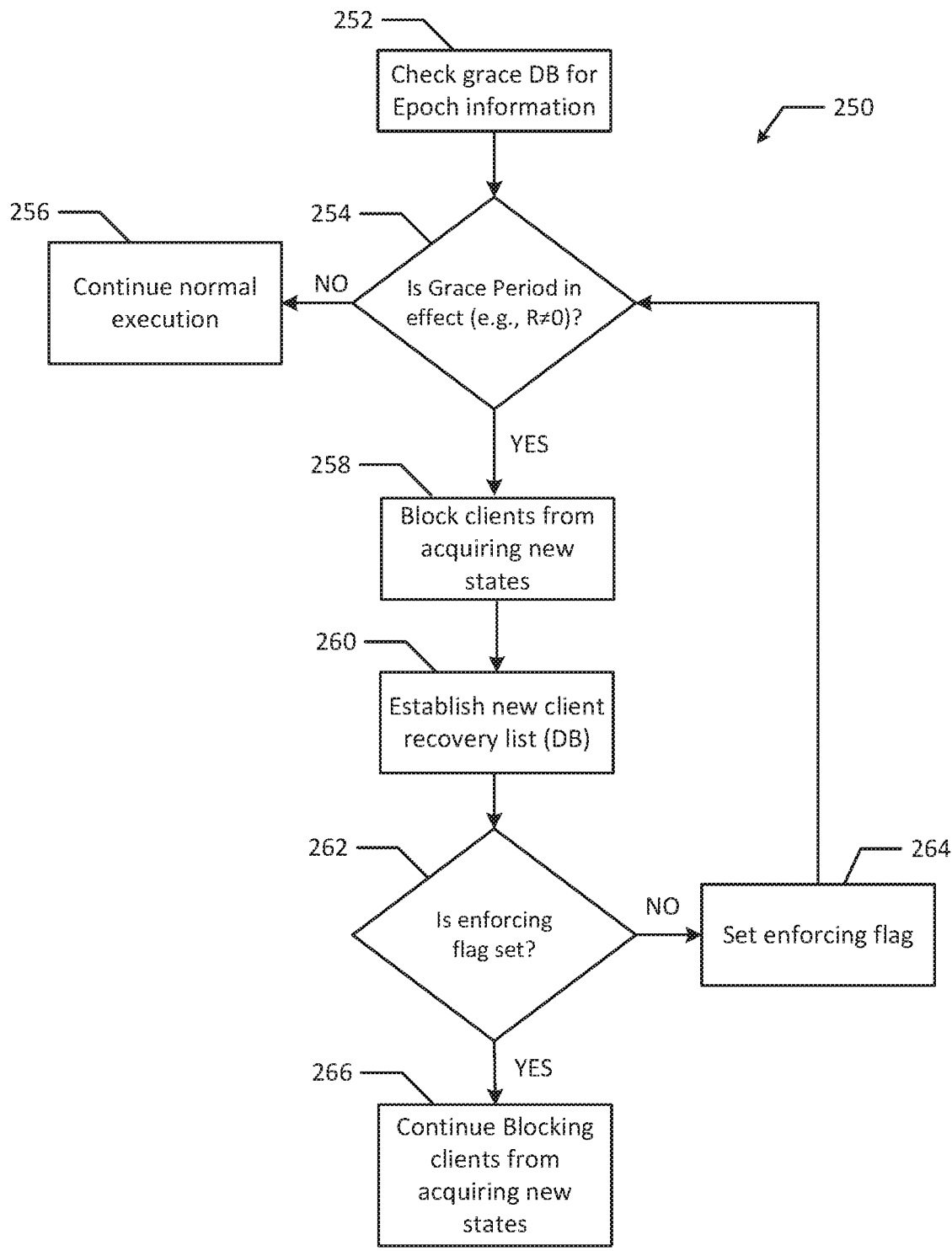
FIG. 2B illustrates a flowchart of an example process for server reclaim for a surviving server according to an example embodiment of the present disclosure.

FIG. 2B illustrates a flowchart of an example process 250 for server reclaim for a surviving server (or node). It will be appreciated that many other methods of performing the acts associated with the process 250 may be used. For example, the order of some of the blocks may be changed, certain blocks may be combined with other blocks, one or more of the blocks may be repeated, and some of the blocks described are optional. A server (e.g., server 104B) may check the grace database 110 for epoch information (block 252). For example, a server 104B may periodically check the grace database 110 to determine whether a grace period is in effect by checking the current epoch value 112 and recovery epoch value 114 in grace database 110. Upon checking the grace database 110, the server 104B may determine if a grace period is in effect (block 254). In the illustrated example, a grace period is in effect if the recovery epoch value 114 is set to a value other than zero (e.g., R=1, which indicates that a grace period is in effect allowing recovery of ephemeral states held during Epoch_1).

If a grace period is not in effect, then the server 104B continues normal execution (block 256). In an example, if the grace period has recently ended and the server cluster 102 is transitioning to normal execution, the server 104A may first clear its "enforcing" flag. During normal execution, servers may allow new clients to establish states and may allow existing clients to establish new states.

If a grace period is in effect, then the server 104B may block clients (e.g., client 106G-H) from acquiring new states (block 258). Additionally, the server 104B may establish a new client recovery list 108B within recovery database 150B (block 260). The new client recovery list 108B may be established for each epoch, and old lists may be deleted after a new list is legitimized. Then, the server 104B may determine whether it has set its "enforcing" flag (block 262). If server 104B has not set its "enforcing" flag, the server 104B may set its "enforcing" flag within grace database 110 (block 264). Once the "enforcing" flag is set, the server 104B may periodically poll the grace database 110 (e.g., grace database object) to determine if the grace period has been lifted cluster wide. After the cluster wide grace period has been lifted, the server 104B may clear its "enforcing" flag and stop enforcing the grace period. A surviving server 104B may start enforcing the grace period as soon as possible. The surviving server 104B may start "draining off" any in-progress state morphing operations and then block the acquisition of any new state. The server 104B may block acquisitions of a new state and return a message to the client 106. For example, the server 104B may send a "NSF4ERR_GRACE" message to the clients 106 that attempt to acquire a new state. The surviving servers (e.g., server 104B) do not need to allow recovery, since they did not crash and reboot, but the surviving servers (e.g., server 104B) may block clients 106 from acquiring new states during the cluster-wide grace period to ensure that conflicted state information is not handed out.

If the server's "enforcing" flag is already set, the server 104B may continue to enforce the grace period by blocking clients (e.g., client 106G-H) from acquiring new states during the grace period (block 266). Clients are blocked from acquiring new states to prevent clients in communication with the cluster server 102 from having conflicting state information, which may cause the system to crash or fail. In an example, when an "enforcing" flag is set, then enforcement is in effect, but a server 104B may still be enforcing a grace period even after the "enforcing" flag is cleared. For example, during the window between beginning or ending enforcement and flipping the "enforcement" flag, the server 104B may be enforcing the grace period slightly before the "enforcing" flag is set or slightly after the "enforcing" flag is cleared.

Figure 3:
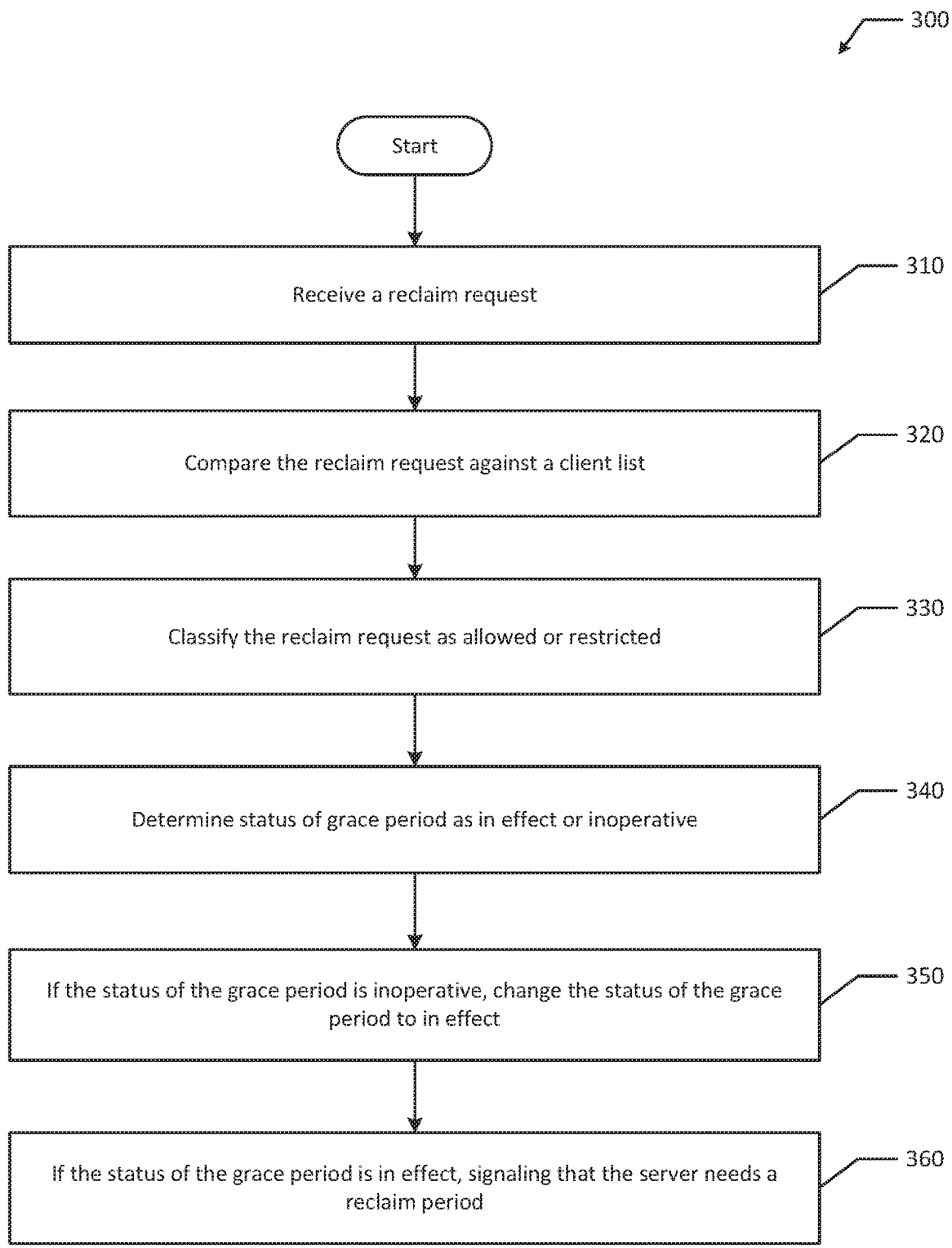
FIG. 3 illustrates a flowchart of an example process for server reclaim according to an example embodiment of the present disclosure.

FIG. 3 illustrates a flowchart of an example method 300 for server reclaim according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more of the blocks may be repeated, and some of the blocks described are optional. The method 300 may be performed by processing logic that may comprise hardware (circuitry, dedicated logic, etc.), software, or a combination of both.

The example method 300 includes receiving a reclaim request (block 310). For example, a server 104A may receive a reclaim request from a client 106A. In an example, the server 104A is part of a server cluster 102. The method 300 also includes comparing the reclaim request against a client list (block 320). For example, a server 104A may compare the reclaim request against a client list 108A. The client list 108A may be stored in a recovery database 150B on stable storage. Stable storage advantageously guarantees atomicity for write operations and is robust against some hardware and power failures. By maintaining the client list 108A on stable storage, the system and methods disclosed herein advantageously prevent edge cases and state inconsistencies that may occur involving network partitions and multiple reboots.

Method 300 continues with classifying the reclaim request as allowed or restricted (block 330). For example, server 104A may classify the reclaim request as either allowed or restricted. A reclaim request may be classified as allowed if the client 106A sending the request is listed in the client list 108A associated with the epoch indicated in the reclaim request. Alternatively, the reclaim request may be classified as restricted if the client 106A is not listed in the client list 108A. Method 300 also includes determining the status of a grace period as in effect or inoperative (block 340). For example, server 104A may determine the status of the grace period as in effect (e.g., R≠0) or inoperative (e.g., R=0).

Additionally, the method includes changing the status of the grace period to in effect if the status of the grace period is inoperative (block 350). For example, server 104A may change the status of the grace period to in effect. In an example, the server 104A may change the status to in effect by incrementing the reclaim value or recovery epoch value 114 in the grace database 110 (e.g., changing R=0 to R=1). As mentioned previously, the server 104A may change the status of the grace period to in effect immediately after starting to reduce the likelihood of the server cluster 102 handing out conflicting state information. The method 300 also includes signaling that the server needs a reclaim period if the status of the grace period is in effect (block 360). For example, server 104A may signal that it needs a local reclaim or grace period. In an example, the server 104A may signal that it needs a local reclaim or grace period by setting a "need_grace" flag on grace database 110. In other examples, server 104A may signal that it needs a local reclaim or grace period by using a key or token.

All or part of method 300 may be iterated over time, for example every 30 seconds, 60 seconds, every lease period, etc. Additionally, method 300 may be iterated for each reclaim request received. For example, server 104A may receive a reclaim request and ultimately determine the status of the grace period is inoperative change the status of the grace period to in effect (e.g., at blocks 340 and 350). Then, at another point in time, the server 104A may receive another reclaim request and determine that the status of the grace period is in effect and signal that the server 104A needs a reclaim period (e.g., at blocks 340 and 360).

Figure 4:
FIG. 4 illustrates a flowchart of an example process for server reclaim according to an example embodiment of the present disclosure.
Figure 5A:
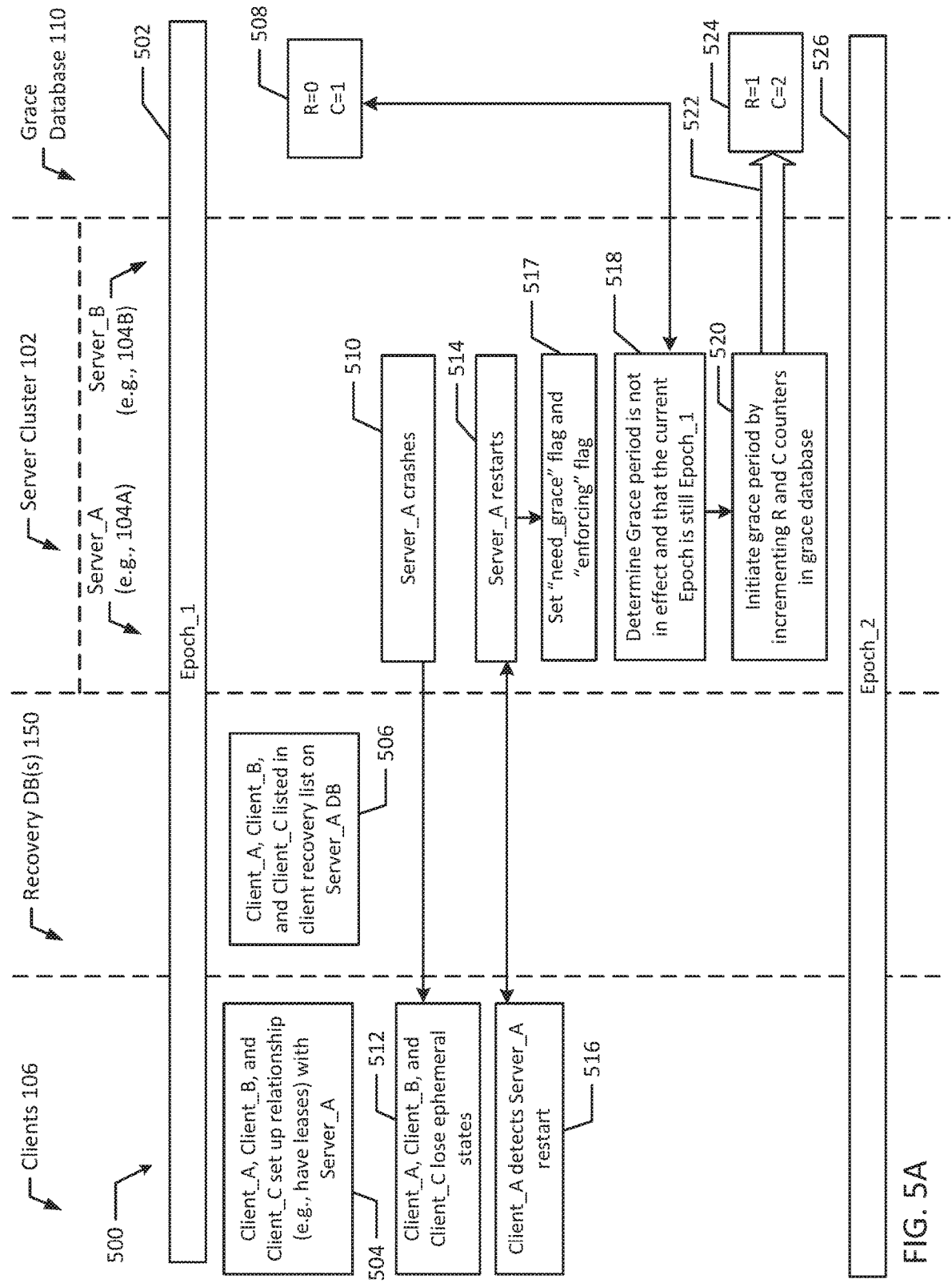
FIGS. 5A, 5B, 5C and 5D illustrates a flow diagram of an example process for clustered server reclaim via a decentralized, coordinated grace period according to an example embodiment of the present disclosure.
Figure 5B:
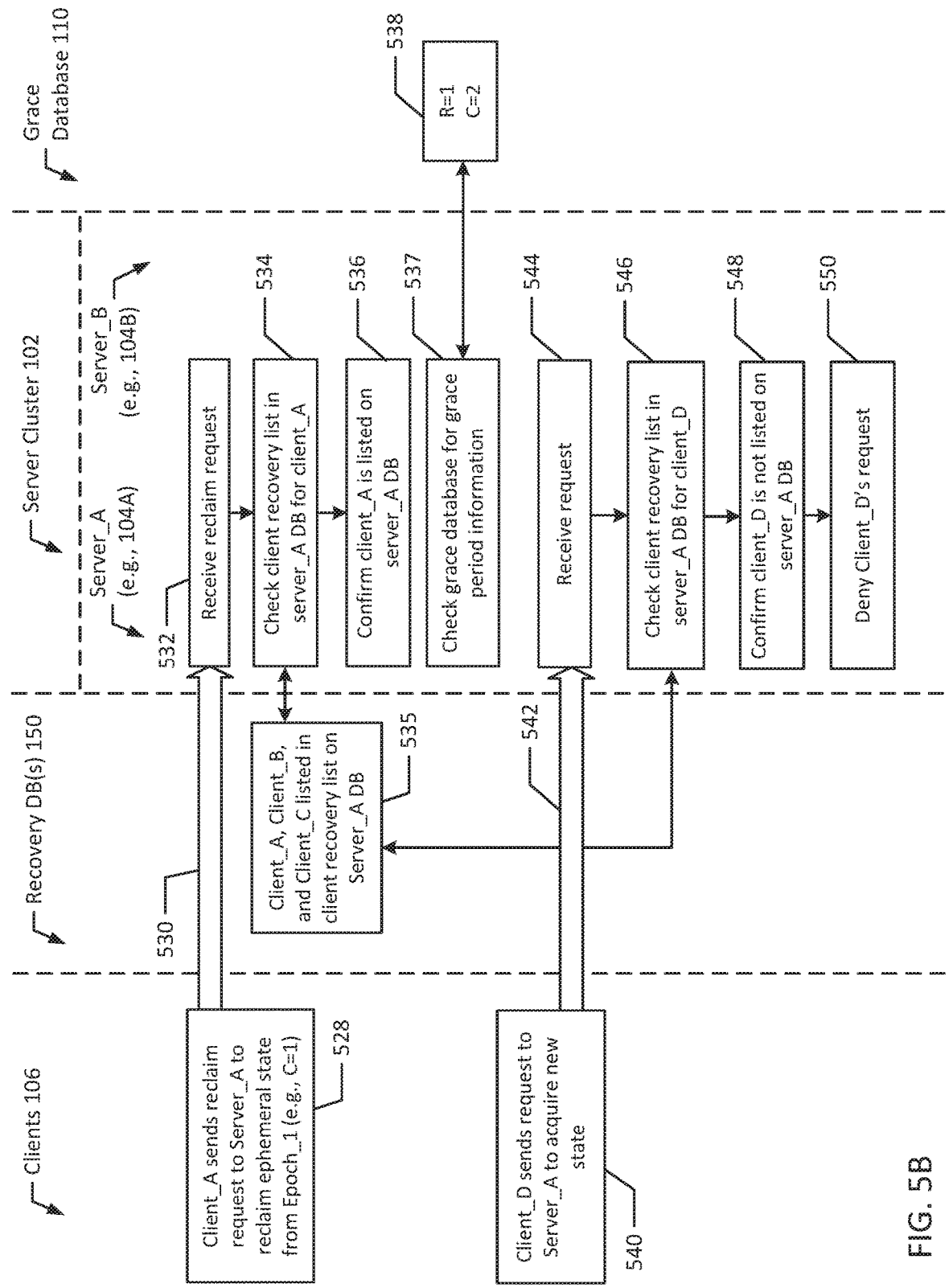
Figure 5C:
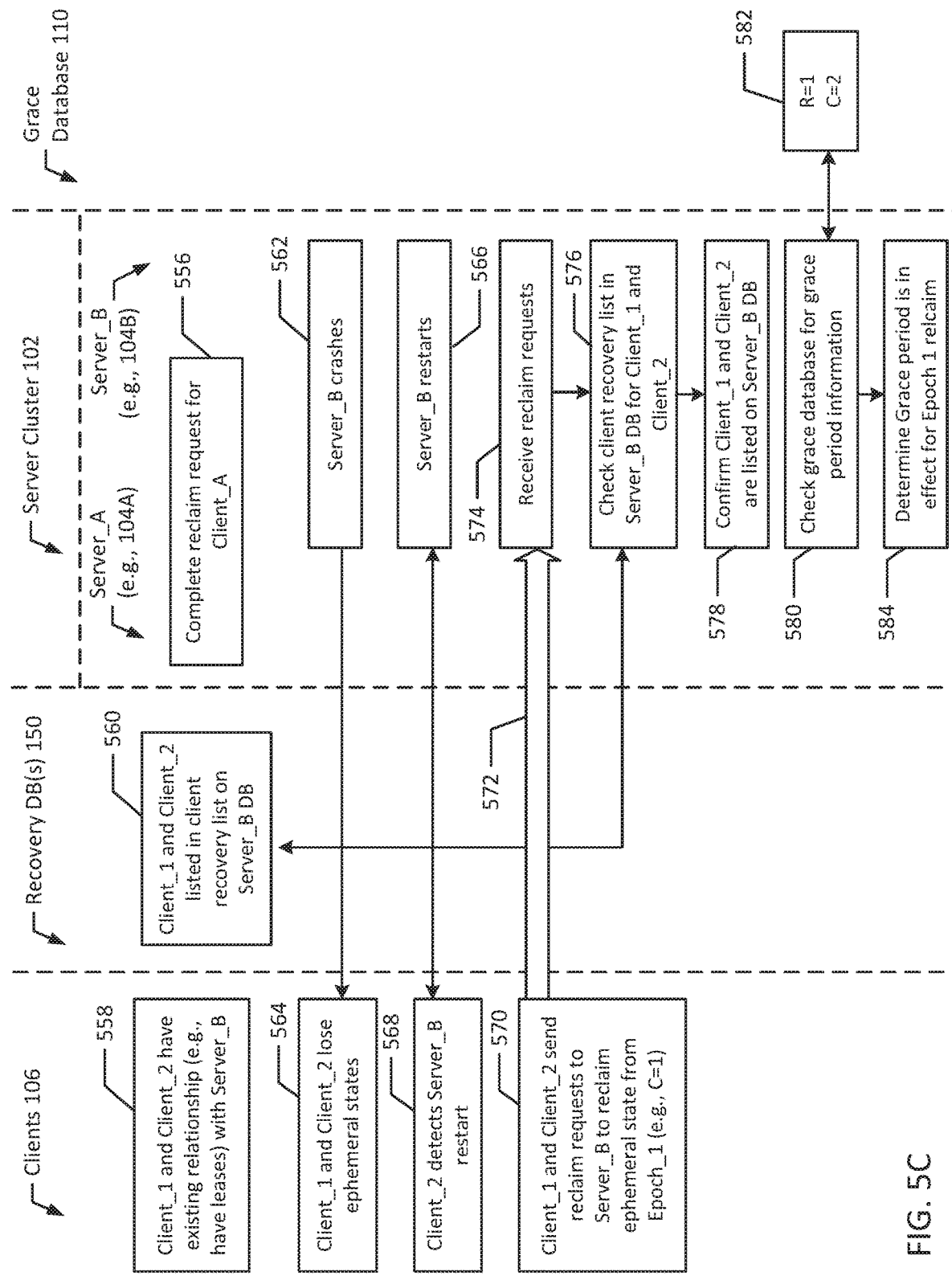
Figure 5D:
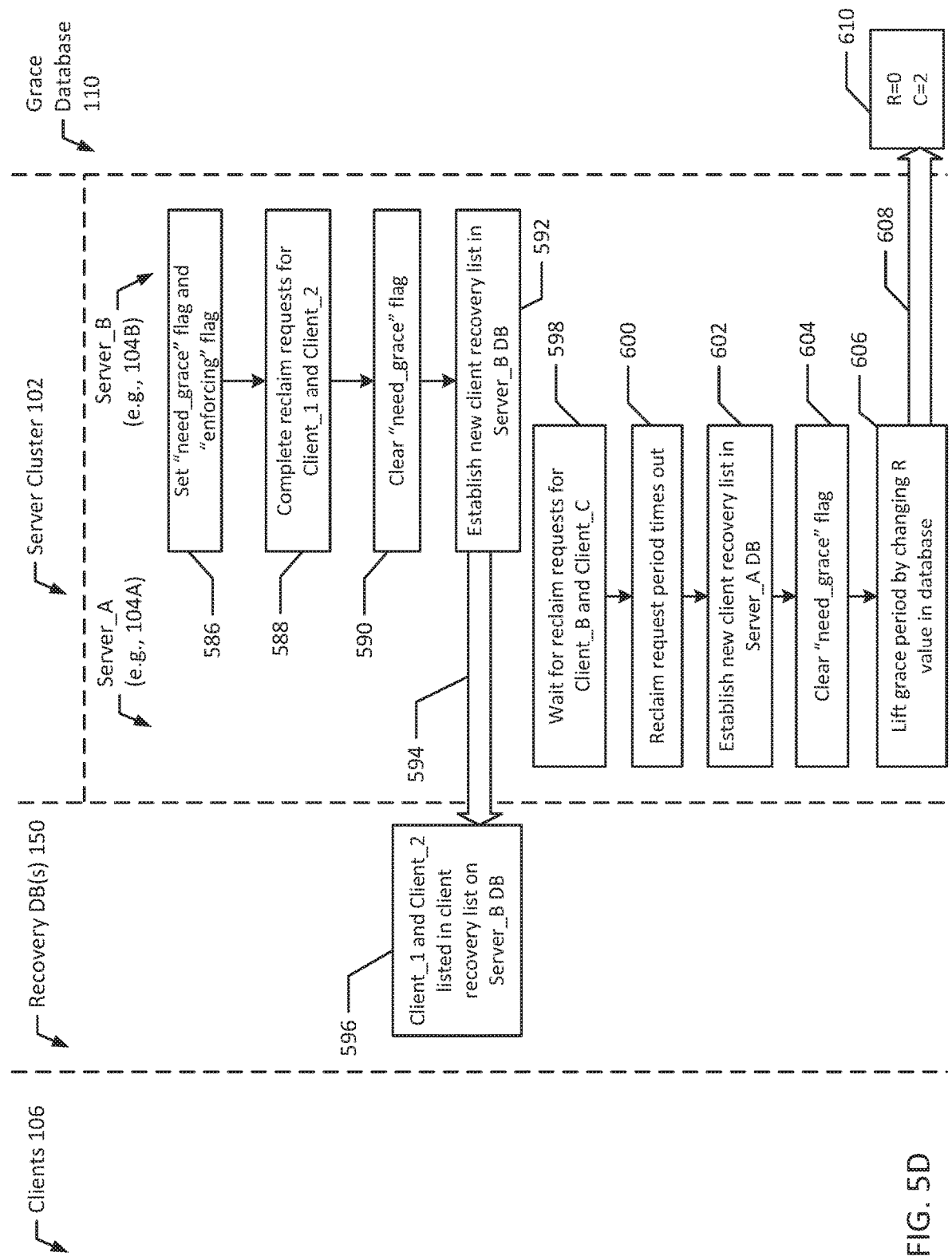

FIG. 4 illustrates a flowchart of an example method 400 for server reclaim according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, one or more of the blocks may be repeated, and some of the blocks described are optional. The method 400 may be performed by processing logic that may comprise hardware (circuitry, dedicated logic, etc.), software, or a combination of both.

The example method 400 includes maintaining an epoch value and reclaim value (block 410). For example, a database (e.g., grace database 110) may maintain an epoch value (e.g., current epoch value 112) and a reclaim value or recovery epoch value 114. In an example, the epoch value 112 indicates the current epoch and the reclaim value indicates from which epoch reclaim is allowed. Method 400 also includes querying the epoch value and the reclaim value to determine a grace period stats as in recovery or in normal operation (block 420). For example, a server 104A may query the epoch value 112 and the reclaim value or recovery epoch value 114 to determine whether the server cluster 102 is in recovery (e.g., in a grace period) or in normal operation.

Additionally, method 400 includes allowing a client to reclaim a previous operational state if the system is in recovery (block 430). For example, if the server 104A determines that the server cluster 102 is in a grace period or in recovery, the server 104A may allow clients 106 to reclaim a previous operational state as long as that previous operational state is from the epoch that reclaim is currently allowed. The server 104A may allow clients 106 to reclaim previous operation states after the other servers 104B-C in the server cluster 102 have indicated that they are enforcing the grace period, for example by setting their respective "enforcing" flags. If the system is in normal operation, method 400 includes preventing the client from reclaiming the previous operational state (block 440). For example, server 104A may prevent clients from reclaiming a previous operational state if the server cluster 102 is in normal operation. The server 104A may prevent clients from reclaiming a previous operational state until that server 104A has had a chance to initiate a new reclaim period.

Method 400 continues and tracks a set of flags associated with each server of the server cluster (block 450). For example, the database (e.g., grace database 110) may track a set of flags associated with each server (e.g., servers 104A-C) of the server cluster 102. In an example, the grace database 110 may track "need_grace" flags and "enforcing" flags for each server 104A-C of the server cluster 102. Additionally, method 400 queries the database for a flag status of each server as completed reclaim or pending reclaim (block 460). For example, sever 104A may query the database (e.g., grace database 110) for the flag status of each server. In an example, the server 104A may check the grace database 110 to determine which servers have set a "need_grace" flag and also may check to see if each server of the server cluster 102 is enforcing the grace period, which is indicated by those servers setting their "enforcing" flags.

If each server has completed reclaim, method 400 includes editing the reclaim value in the database to change the cluster status to in normal operation (block 470). For example, the server 104A may edit the reclaim value in the grace database 110 to change the cluster status to in normal operation. In an example, each server has completed reclaim if all of the "need_grace" flags have been cleared. If a server 104A-C in the server cluster 102 does not need a local grace period or reclaim period, that server may not initially set its "need_grace" flag, and thus the flag appears cleared to other servers querying the grace database 110. If each server has not completed reclaim, the method includes enforcing the grace period (block 480). For example, the server 110A may enforce the grace period by keeping its "enforcing" flag set at grace database 110.

All or part of method 400 may be iterated over time, for example every 30 seconds, 60 seconds, every lease period, etc. For example, in one iteration, the server may determine that the cluster is in recovery and allow a client to reclaim (e.g., at blocks 420 and 430), while in another iteration, the server 104A may determine that the server cluster is operating normally and may prevent a client from reclaiming (e.g., at blocks 420 and 440). Similarly, different iterations may include different outcomes from querying the database for a flag status (e.g., at blocks 470 and 480).

FIGS. 5A, 5B, 5C and 5D illustrate a flowchart of an example method 500 for clustered NFS server reclaim via a decentralized, coordinated grace period in accordance with an example embodiment of the present disclosure. Although the example method 500 is described with reference to the flowchart illustrated in FIGS. 5A, 5B, 5C and 5D, it will be appreciated that many other methods of performing the acts associated with the method 500 may be used. For example, the order of some of the blocks may be changed, certain blocks may be combined with other blocks, one or more of the blocks may be repeated, and some of the blocks described are optional. For example, servers 104A-B in a server cluster 102 may communicate with a grace database 110, clients 106, and recovery databases 150 to perform example method 500.

In the illustrated example, the current epoch of the system is "Epoch_1" (block 502). For example, the lifecycle of a server in a server cluster may be considered as a series of transitions from recovery to normal operation and back. Each period of recovery and normal transition is an epoch, which is established as a cluster-wide lifecycle. Various clients (e.g., "Client_A", "Client_B", and "Client_C") have a relationship (e.g., have leases established) with "Server_A" (block 504). For example, clients set up a relationship with a server and periodically renew their lease in order to maintain their ephemeral state (open files, locks, delegations, layouts, etc.). Due to their relationship with Server_A, "Client_A", "Client_B", and "Client_C" are listed in the client recovery list on the server's recovery database 150 (block 506). For example, the server may maintain a stable storage record where the server makes a record, associated with the current epoch, for each client that has a relationship with the server during that epoch. In an example, the server may establish a record for a client prior to the client performing its first open (whether during reclaim or during normal operations). In the illustrated example, the grace database maintains a reclaim value or recovery epoch value 114 and a current epoch value 112. The reclaim value or recovery epoch value 114, illustrated as "R" is currently zero and the current epoch value, illustrated as "C" is one (block 508). In an example, the reclaim value 114 and the current epoch value 112 may be unsigned, 64-bit integers.

At a certain point in time, Server_A crashes (block 510). For example, a server may crash due a network problem, due to system overload at peak traffic or during maintenance, or because of hardware errors. Client_A, Client_B, and Client_C lose their ephemeral states (block 512). When Server_A crashes, the relationship between the server 104A and the respective clients 106 is broken and the ephemeral states of the clients is lost. After some time, Server_A restarts (block 514). In the illustrated example, Server_A restarts during the same epoch. Then, Client_A detects that Server_A has restarted (block 516). The server 104A may send a communication to each of its previous clients 106 that the server 104A is up and running again. In another example, clients 106 (e.g., Client_A) may continue to attempt to establish a relationship with the server 104A until they are successful, thereby detecting that the server 104A has restarted.

After restarting, Server_A may initiate the grace period and sets its "need_grace" flag and "enforcing" flag (block 517). Server_A may set both flags at the same time. In another example, the server 104A may first set its "need_grace" flag to indicate that it needs to allow client reclaim and then set its "enforcing" flag to indicate that it is enforcing its own initiated grace period, for example, by preventing clients from obtaining new states. After other servers 104B-C notice that a grace period has been initiated, they may indicate that they are enforcing the grace period. In an example, the surviving servers 104B-C may "drain off" any in progress operations that would be disallowed during the grace period. After draining off in progress operations, the surviving servers 104B-C my set their "enforcing" flags. Additionally, the surviving databases may create a new recovery database 150B-C for the new epoch and write records for active clients into the new recovery databases 150B-C.

Server_A determines that a grace period is not in effect and that the current epoch is Epoch_1 (block 518). The server 104A may determine the grace period is not in effect based on the current reclaim value or recovery epoch value 114. For example, R=0 indicates that the server cluster 102 is operating normally and that a grace period is not in effect. Because a grace period is not in effect, Server_A initiates a grace period by incrementing the current epoch value 112 (e.g., C=C+1) and the recovery epoch value 114 (e.g., setting R=1) counters in the grace database 110 (blocks 520 and 522). It should be appreciated that other techniques of initiating a grace period may be used, for example, using different values or by setting a flag or posting a key or token. In an example, a grace period timer may start after the grace period is initiated. The grace period timer may provide a time limit for clients to reconnect and reclaim a previous state, for example, a time limit of 90 seconds to 120 seconds. Now, the grace database 110 includes values that indicate that the current epoch is Epoch_2 (e.g., C=2) and there is a grace period in effect to reclaim ephemeral states from Epoch_1 (e.g., R=1) (block 524). By changing the value from R=0 to R=1, the grace database now indicates that the server cluster 102 is in a grace period. As other servers 104 in the server cluster observe the new reclaim value or recovery epoch value 114, those servers 104 will start enforcing the grace period.

After initiating the grace period, a new epoch (e.g., Epoch_2) is established for the server cluster 102 (block 526). Any subsequent server reboots that occur while in the grace period may use the grace period for reclaiming. However, if a server reboots after the server cluster 102 has resumed normal operation under Epoch_2, a subsequent server reboot may result in transitioning the server cluster 102 to the next epoch.

After detecting that Server_A has restarted, Client_A sends a reclaim request to Server_A to reclaim its ephemeral state from Epoch_1 (blocks 528 and 530). Since Client_A lost its ephemeral state when the server is restarted, the client 104A may send a reclaim request to the server 104A.

Then, Server_A receives the reclaim request (block 532). The server 104A may receive reclaim requests from each client that established a relationship with the server during Epoch_1. After receiving the request, Server_A checks the client recovery list in the server's recovery database 150A for any entry for Client_A (block 534). For example, Server_A determines whether Client_A was active during the previous Epoch (e.g., Epoch_1). In an example, the server's recovery database 150A may be loaded into memory as soon as the server 104A restarts. Due to their relationship with Server_A, "Client_A", "Client_B", and "Client_C" are listed in the client recovery list on the server's recovery database 150 (block 535). Then, Server_A confirms that Client_A is listed on the server's recovery database 150 (block 536). For example, the server 104A may compare the client identified in the reclaim request against the appropriate client list 108A in the recovery database 150A, e.g., the client list 108A associated with Epoch_1.

After confirming that Client_A's request is valid, the server 104A checks the grace database 110 for grace period information (block 537). In an example, grace period information may already be known to the server 104A. For example, upon restart, the server 104A may automatically check the grace database for grace period information and current Epoch information, e.g., by checking the reclaim value 114 and current epoch value 112. Additionally, the current epoch may be determined when the recovery database 150A is loaded into memory since the recovery database 150A includes a client list 108A associated with the last epoch that the server 104A was running in. The current server cluster 102 is in a grace period with R=1 and C=2 (block 538). In the illustrated example, a grace period is in effect whenever R≠0.

A new client (e.g., "Client_D") may attempt to establish a lease or send a request to Server_A to acquire a new state (blocks 540 and 542). For example, a new client may attempt to establish a lease with server 104A. Then Server_A may receive the request (block 544). For example, server 104A may receive a lease request or a file open request. After receiving the request, Server_A may check the client recovery list 108A in Server_A's recovery database 150A for an entry corresponding to Client_D (block 546). For example, the server 104A may handle this request similar to the reclaim request received by Client_A. However, only Client_A, Client_B, and Client_C are listed in the client recovery list 108A in the recovery database 150A. For example, referring back to blocks 504, 506 and 535, Client_D did not have a lease with Server_A during Epoch_1 and thus the server 104A did not establish a record for Client_D in a client list 108A corresponding to Epoch_1. After checking the client recovery list 108A, Server_A confirms that Client_D is not listed on Server_A's recovery database 150A (block 548) and denies Client_D's request to acquire a new state (block 550). In an example, Client_D's request for new state may be denied regardless of Client_D's presence in the recovery database 150A (e.g., Server_A may deny the request without checking the recovery database 150A) because during the grace period any request for new state is denied. If the server cluster 102 was operating under normal operating conditions (e.g., and not in a grace period), then server 104A may approve the request. However, during a grace period new states are prohibited from being established by existing clients 106 or new clients (e.g., Client_D). Allowing new states to be established may cause problems across the server cluster 102, especially in cases involving network partitions.

After the grace period is in effect, Server_A may complete the reclaim request for Client_A (block 556). The server 104A may complete the reclaim request by re-establishing the ephemeral state (e.g., open files, locks, etc.) of Client_A prior to Server_A crashing.

In the illustrated example, "Client_1" and "Client_2" have an existing relationship with (e.g., have leases established) with Server_B (block 558). For example, while Client_A, Client_B, and Client_C were communicating with Server_A, Client_1 and Client_2 were communicating with and established leases with Server_B. Because Client_1 and Client_2 had established relationships with Server_B during Epoch_1, both clients are listed in the client recovery list 108B on Server_B's recovery database 150B (block 560). For example, a record of both Client_1 and Client_2 may be maintained in a stable storage record (e.g., client list 108B on recovery database 150B) associated with the Epoch_1. Now that the server cluster 102 is in Epoch_2, server 104B may start making a new record or new client list 108B for each of its respective clients (e.g., Client_1 and Client_2) associated with Epoch_2.

Server_B may also crash (block 562) causing Client_1 and Client_2 to lose their ephemeral states (block 564). When Server_B crashes, the relationship between the server 104A and the respective clients 106 is broken and the ephemeral states of the clients is lost. After crashing, Server_B restarts (block 566). In the illustrated example, Server_B restarts during the initiated grace period in Epoch_2. The server 104B may automatically attempt to restart. In an example, a server may restart prior to a subsequent lease period. Client_2 detects that Server_B has restarted (block 568). The client may detect the restart based on a communication from the server 104B or by sending a communication request to Server_B. Additionally, Client_1 may detect that Server_B has restarted. Then, Client_1 and Client_2 send reclaim requests to Server_B to reclaim their respective ephemeral states from Epoch_1 (e.g., C=1) (blocks 570 and 572). Since Server_B had not yet established a new client list 108B for Epoch_2, the clients request to reclaim from their last established state, which is still associated with Epoch_1. In an example, clients (e.g., Client_1 and Client_2) may wait to send reclaim requests until after Server_B has set its "need_grace" flag and "enforcing" flag (e.g., after block 586).

Server_B receives the reclaim requests from Client_1 and Client_2 (block 574). In an example, the server 104B may set its "need_grace" flag until it receives reclaim requests for each client that had a lease established with the server 104B during the epoch that the server was still running in. In another example, the server 104B may wait for or allow reclaim requests for a specified period of time (e.g., two or three lease cycles, which may each typically last 30 seconds, giving a reclaim period of 60 seconds to 120 seconds). Then, Server_B checks the client recovery list in Server_B's recovery database 150B for entries corresponding to Client_1 and Client_2 (block 576). For example, server 104B may compare the clients identified in the reclaim requests against the appropriate client list 108B in the recovery database 150B. Server_B confirms that both Client_1 and Client_2 are listed on the client list 108B in the recovery database 150B (block 578). The server 104B confirms that the clients are listed on the stable storage record to prevent a different client or an existing client from establishing a new state (e.g., a new state acquisition of new opens or locks) during the grace period, which would cause problems on the distributed server cluster 102 resulting from two or more clients having conflicting state information. However, establishing a lease (e.g., an NSFv4 lease via EACHANGE_ID operation) may be allowed during grace period enforcement. After confirming that both clients are allowed to reclaim their previous state, Server_B checks the grace database 110 for grace period information (block 580). For example, server 104B may check the reclaim value or recovery epoch value 114 to determine if the server cluster 102 is in a grace period. The current server cluster 102 is in a grace period with R=1 and C=2 (block 582). As mentioned above, in the illustrated example, a grace period is in effect whenever R≠0. Server_B determines that a grace period is in effect for reclaiming ephemeral states established in Epoch_1 (block 584). Since R=1, the grace database indicates that a grace period is in effect, which is allowing reclaim to Epoch_1.

Server_B sets its "need_grace" flag and "enforcing" flag (block 586). For example, Server_104B indicates that it needs to allow client reclaim and that it is enforcing its own reclaim period by setting the "need_grace" flag and the "enforcing" flag. In an example, Server_B may set its "need_grace" flag and "enforcing" flag immediately after restarting (e.g., similar to Server_A at block 517). The "enforcing" flag indicates that the server 104B is preventing clients from obtaining new states. Server_B completes the reclaim requests for Client_1 and Client_2 (block 588). After completing the reclaim requests for each client listed in the recovery database 150B, Server_B clears its "need_grace" flag (block 590). Since each client (e.g., Client_1 and Client_2) that had a lease with Server_B during Epoch_1 have both reclaimed their previous ephemeral state, the server 104B may clear its "need_grace" flag and may continue enforcing the grace period until each server has completed its local reclaim period.

Additionally, Server_B establishes a new client recovery list 108B in the recovery database 150B that includes Client_1 and Client_2 for Epoch_2 (blocks 592 and 594). For example, the server 104B may create a new stable storage record where the associated with Epoch_2 for Client_1 and Client_2. In an example, the server 104B may establish a record for a client prior to completing the reclaim requests. Additionally, record may be established after completing the reclaim requests or prior to a client performing its first open. Now, Client_1 and Client_2 are listed in the client recovery list 108B on the recovery database 150B of Server_B (block 596). Once the new client recovery list is created, the old list may be deleted. In an example, old client recovery lists 108B may be deleted after the server cluster 102 starts operating normally after the current grace period ends and has been lifted. By waiting for the current grace period to be lifted before deleting the old client list 108B, the system advantageously avoids scenarios where other servers (e.g., Server_C) suddenly crash prior to the end of a grace period and are left without a recovery database. For example, if the old client list 108B or recovery database 150B is deleted prior to lifting the grace period and a server (e.g., Server_C) suddenly crashes prior to lifting the grace period, Server_C may join the existing grace period upon restart. After joining the existing grace period, Server_C may try to allow recovery from Epoch_1's recovery database, but that database was previously deleted leaving Server_C unable to complete recovery.

During this time, Server_A may wait for reclaim requests for Client_B and Client_C (block 598). For example, Server_A may wait for additional reclaim requests from clients it expects will try to reclaim their previously held ephemeral state. In an example, the server 104A may determine which clients will likely attempt to reclaim ephemeral states by reviewing the client list 108A. In the illustrated example, the reclaim request period times out (block 600). For example, the reclaim period may last a predetermined amount of time (e.g., a time limit of 90 seconds to 120 seconds) or a predetermined quantity of lease periods (e.g., two lease periods). Then, Server_A establishes a new client recovery list 108A in recovery database 150A (block 602). The new client recovery list 108A now only includes Client_A and is associated with Epoch_2 since neither Client_B or Client_C requested to reclaim their previous states. Server_A clears its "need_grace" flag (block 604). Since the reclaim request period timed out, Server_A the local grace period for Server_A ends. Future reclaim requests (e.g., requests from Client_B and/or Client_C) may be fulfilled by initiating a new grace period or by having those clients establish new states under the current epoch (e.g., Epoch_2).

After clearing its "need_grace" flag, Server_A may determine that it is the last server 104A in the server cluster 102 to clear its "need_grace" flag. Since Server_A is the last server to clear its "need_grace" flag, Server_A lifts the grace period by changing the recovery epoch value 114 in the grace database 110 (blocks 606 and 608). In the illustrated example, Server_A lifts the grace period by setting R=0 again. Now, the grace database 110 indicates that the current epoch is Epoch_2 and that there is not a grace period in effect (e.g., recovery epoch value=0) (block 610). A server may decide to lift its local recovery period if the server 104A no longer requires a grace period either due to the grace period timing out or because all of the clients listed in the recovery database 150A have already completed the reclaim process. After the grace period is lifted, each of the servers 104A-C may stop enforcing the grace period and clear their respective "enforcing" flags. Additionally, after the grace period is lifted, each of the servers 104A-C in the server cluster 102 may transition to normal operation and allow clients to acquire new states.

Figure 6:
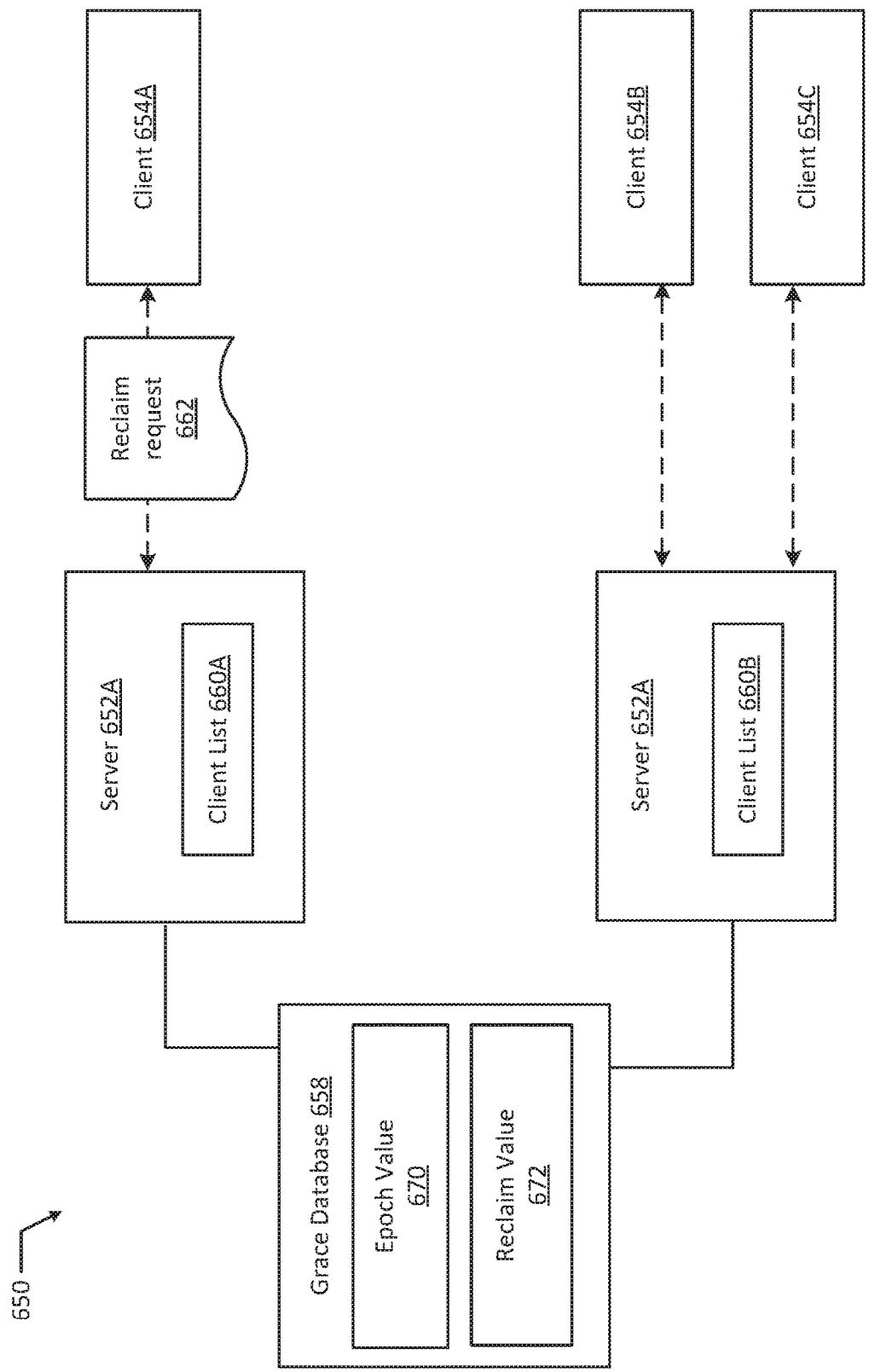
FIG. 6 illustrates a block diagram of an example clustered NFS server reclaim system according to an example embodiment of the present disclosure.

FIG. 6 is a block diagram of an example clustered NFS server reclaim system 650 according to an example embodiment of the present disclosure. Reclaim system 650 includes a plurality of clustered servers 652A-B, a plurality of clients 654A-C communicating with the plurality of clustered servers 652A-B, and a grace database 658. Each of the plurality of clustered servers 652A-B may maintain a respective client recovery list 660A-B. A client 654A of the plurality of clients 654A-C may be configured to send a reclaim request 662 to a server 652A of the plurality of clustered servers 652A-B. The grace database 658 may be configured to maintain an epoch value 670 and a reclaim value 672. The epoch value 670 indicates the current epoch, and the reclaim value 672 indicates from which epoch reclaim is allowed. The server 652A of the plurality of clustered servers 652A-B may be configured to maintain a client list 660A and receive the reclaim request 662 from the client 654A. The client list 660A indicates each client (e.g., client 654A) currently holding state on the server 652A.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a plurality of clustered servers, a plurality of clients communicating with the plurality of clustered servers, and a grace database. Each of the plurality of clustered servers maintains a respective client recovery list. A client of the plurality of clients is configured to send a reclaim request to a server of the plurality of clustered servers. The grace database is configured to maintain an epoch value and a reclaim value. The epoch value indicates the current epoch, and the reclaim value indicates from which epoch reclaim is allowed. The server of the plurality of clustered servers is configured to maintain a client list and receive the reclaim request from the client. The client list indicates each client currently holding state on the server.

In a 2nd exemplary aspect of the present disclosure, which may be used in combination with any one or more of the preceding aspects (e.g., the 1st aspect), the server is further configured to compare the reclaim request against a client list, classify the reclaim request as either allowed or restricted, and determine a first status of a grace period as either in effect or inoperative. In responsive to determining the first status of the grace period as inoperative, the server is configured to increment the reclaim value of the grace database to change the first status of the grace period to in effect. Additionally, the server is configured to execute the reclaim request.

In a 3rd exemplary aspect of the present disclosure, which may be used in combination with any one or more of the preceding aspects (e.g., the 2nd aspect), the server is further configured to check a second status of other servers in the cluster and classify the second status of other servers in the server cluster as either completed reclaim or pending reclaim. Responsive to classifying the second status as completed reclaim, the server is configured to lift the grace period. Responsive to classifying the second status as pending reclaim, the server is configured to continue enforcing the grace period.

In a 4th exemplary aspect of the present disclosure, which may be used in combination with any one or more of the preceding aspects (e.g., the 2nd aspect), the server is further configured to increment the epoch value of the grace database to define a new current epoch, responsive to determining the first status of the grace period as inoperative.

In a 5th exemplary aspect of the present disclosure, which may be used in combination with any one or more of the preceding aspects (e.g., the 4th aspect), the server is further configured to establish a record of the client in a new client list associated with the new current epoch, responsive to executing the reclaim request.

In a 6th exemplary aspect of the present disclosure, which may be used in combination with any one or more of the preceding aspects (e.g., the 1st aspect), the server is configured to lift the grace period by setting the reclaim value in the grace database to zero.

In a 7th exemplary aspect of the present disclosure, which may be used in combination with any one or more of the preceding aspects (e.g., the 1st aspect), the client list is maintained on stable storage.

In an 8th exemplary aspect of the present disclosure, which may be used in combination with any one or more of the preceding aspects (e.g., the 1st aspect), the reclaim request indicates a client state. The client state indicates a file, a lock, a delegation, and/or a layout.

Aspects of the subject matter described herein may be useful alone or in combination with one or more other aspects described herein. In a 9th exemplary aspect of the present disclosure, a system includes a plurality of clustered servers and a plurality of clients communicating with the plurality of clustered servers. Each of the plurality of clustered servers maintains a respective client recovery list. A client of the plurality of clients is configured to send a reclaim request to a server of the plurality of clustered servers. The server of the plurality of clustered servers is configured to compare the reclaim request against a client list maintained by the server, classify the reclaim request as either allowed or restricted, and determine a first status of a grace period as either in effect or inoperative. Responsive to determining the first status of the grace period as inoperative, the server is configured to change the first status of the grace period to in effect. Responsive to determining the first status of the grace period as in effect, the server is configured to execute the reclaim request. Additionally, the server is configured to lift the grace period In a 10th exemplary aspect of the present disclosure, which may be used in combination with any one or more of the preceding aspects (e.g., the 9th aspect), the server is further configured to establish a new record of the client in a new client list responsive to executing the reclaim request.

In an 11th exemplary aspect of the present disclosure, which may be used in combination with any one or more of the preceding aspects (e.g., the 10th aspect), the server is further configured to legitimize the new client list responsive to lifting the grace period.

In a 12th exemplary aspect of the present disclosure, which may be used in combination with any one or more of the preceding aspects (e.g., the 11th aspect), the server is further configured to delete any previous client lists responsive to legitimizing the new client list.

Aspects of the subject matter described herein may be useful alone or in combination with one or more other aspects described herein. In a 13th exemplary aspect of the present disclosure, a method includes receiving, by a server, a reclaim request from a client. The server is part of a server cluster. There server compares the reclaim request against a client list, classifies the reclaim request as either allowed or restricted, and determines a first status of a grace period as either in effect and inoperative. Responsive to determining the first status of the grace period as inoperative, the server changes the first status of the grace period to in effect. Responsive to determining the first status of the grace period as in effect, the server signals that the server needs a reclaim period.

In a 14th exemplary aspect of the present disclosure, which may be used in combination with any one or more of the preceding aspects (e.g., the 13th aspect), changing the first status of the grace period to in effect includes incrementing, by the server, a reclaim value of a grace database.

In a 15th exemplary aspect of the present disclosure, which may be used in combination with any one or more of the preceding aspects (e.g., the 13th aspect), signaling that the server needs a reclaim period includes setting, by the server, a need_grace flag.

In a 16th exemplary aspect of the present disclosure, which may be used in combination with any one or more of the preceding aspects (e.g., the 13th aspect), the method further includes executing, by the server, the reclaim request. Additionally, the server clears a need_grace flag used to signal that the server needed a reclaim period. Responsive to clearing the need_grace flag, the server checks a second status of other servers in the server cluster and classifies the second status of the other servers in the server cluster as either completed reclaim or pending reclaim. Responsive to classifying the second status as completed reclaim, the server lifts the grace period. Responsive to classifying the second status as pending reclaim, the server continues enforcing the grace period In a 17th exemplary aspect of the present disclosure, which may be used in combination with any one or more of the preceding aspects (e.g., the 13th aspect), the method of claim further includes receiving, by a different server in the server cluster, a different reclaim request from a different client. The server is a first server and the different server is a second server. The second server determines that the first status of a grace period as in effect and responsive to determining the first status of the grace period as in effect, the second server executes the different reclaim request.

In an 18th exemplary aspect of the present disclosure, which may be used in combination with any one or more of the preceding aspects (e.g., the 13th aspect), the method further includes responsive to determining the first status of the grace period as inoperative, incrementing, by the server, an epoch value of the grace database to define a new current epoch. The epoch value indicates the current epoch.

In a 19th exemplary aspect of the present disclosure, which may be used in combination with any one or more of the preceding aspects (e.g., the 13th aspect), the method further includes responsive to executing the reclaim request, establishing, by the server, a record of the client in a new client list associated with the new current epoch.

In a 20th exemplary aspect of the present disclosure, which may be used in combination with any one or more of the preceding aspects (e.g., the 19th aspect), lifting the grace period includes setting a reclaim value in the grace database to zero. The reclaim value indicates from which epoch reclaim is allowed.

In a 21st exemplary aspect of the present disclosure, which may be used in combination with any one or more of the preceding aspects (e.g., the 20th aspect), the method of claim further includes legitimizing, by the server, the new client list responsive to lifting the grace period.

In a 22nd exemplary aspect of the present disclosure, which may be used in combination with any one or more of the preceding aspects (e.g., the 21st aspect), the method further includes responsive to legitimizing the new client list, deleting, by the server, any previous client lists.

In a 23rd exemplary aspect of the present disclosure, which may be used in combination with any one or more of the preceding aspects (e.g., the 13th aspect), the client list is maintained on stable storage.

Aspects of the subject matter described herein may be useful alone or in combination with one or more other aspects described herein. In a 24th exemplary aspect of the present disclosure, a method includes (i) monitoring, by a server, a grace database, wherein the server is part of a server cluster, (ii) determining, by the server, a current epoch value of the server cluster and a recovery epoch value of the server cluster, (iii) determining, by the server, a cluster status of the server cluster as either in effect or inoperative, (iv) responsive to determining the cluster status of the server cluster, checking, by the server, a flag status of the server, (v) classifying, by the server, the flag status as either cleared or established, (vi) responsive to classifying the flag status as established, blocking, by the server, a client communicating with the server from acquiring a new state, (vii) responsive to classifying the flag status as cleared, enforcing, by the server, the grace period, (viii) establishing, by the server, a new client recovery list, and (iv) iterating (i), (ii), (iii), (iv) and (v).

In a 25th exemplary aspect of the present disclosure, which may be used in combination with any one or more of the preceding aspects (e.g., the 24th aspect), the method further includes executing, by the server, the reclaim request. Additionally, the server classifies a second flag status of the other servers in the server cluster as either completed reclaim or pending reclaim. Responsive to classifying the second flag status as completed reclaim, the server changes the cluster status from in effect to inoperative.

In a 26th exemplary aspect of the present disclosure, which may be used in combination with any one or more of the preceding aspects (e.g., the 24th aspect), the method further includes, responsive to determining the first status of the grace period as inoperative, incrementing, by the server, an epoch value of the grace database to define a new current epoch. The epoch value indicates the current epoch.

Aspects of the subject matter described herein may be useful alone or in combination with one or more other aspects described herein. In a 27th exemplary aspect of the present disclosure, a method includes maintaining, by a database, an epoch value and a reclaim value. The epoch value indicates the current epoch, and the reclaim value indicates from which epoch reclaim is allowed. Additionally, the method includes, responsive to a server reboot, querying, by a server of a server cluster, the epoch value and the reclaim value to determine a cluster status of the cluster as either in recovery or in normal operation. Responsive to determining the status as in recovery the server allows a client to reclaim a previous operational state. Responsive to determining the status as in normal operation, the server prevents the client from reclaiming the previous operational state. The method also includes tracking, by the database, a set of flags associated with each server of the server cluster. The server queries the database for a flag status of each server and classifies the flag status as either completed reclaim or pending reclaim. Responsive to classifying the flag status as completed reclaim, the server edits the reclaim value in the database to change the cluster status to in normal operation. Responsive to classifying the flag status as pending reclaim, the server enforces the grace period.

In a 28th exemplary aspect of the present disclosure, which may be used in combination with any one or more of the preceding aspects (e.g., the 27th aspect), the epoch value, the reclaim value, the set of flags associated with each server are stored as a RADOS object.

In a 29th exemplary aspect of the present disclosure, which may be used in combination with any one or more of the preceding aspects (e.g., the 28th aspect), the server modifies the RADOS object when editing the reclaim value in the database.

In a 30th exemplary aspect of the present disclosure, which may be used in combination with any one or more of the preceding aspects (e.g., the 28th aspect), the server modifies the RADOS object when the server sets a flag and/or clears a flag.

Aspects of the subject matter described herein may be useful alone or in combination with one or more other aspects described herein. In a 31st exemplary aspect of the present disclosure, a non-transitory machine-readable medium storing code, which when executed by a server, is configured to receive a reclaim request from a client. The server is part of a server cluster. The non-transitory machine-readable medium is further configured to compare the reclaim request against a client list, classify the reclaim request as either allowed or restricted, and determine a first status of a grace period as either in effect or inoperative. Responsive to determining the first status of the grace period as inoperative, the non-transitory machine readable medium is configured increment a reclaim value of a grace database to change the first status of the grace period to in effect. Responsive to determining the first status of the grace period as in effect, the non-transitory machine-readable medium is configured to set a need_grace flag.

In a 32nd exemplary aspect of the present disclosure, which may be used in combination with any one or more of the preceding aspects (e.g., the 31st aspect), the non-transitory machine-readable medium is further configured to execute the reclaim request, clear the need_grace flag, and responsive to clearing the need_grace flag, check a second status of other servers in the server cluster. Additionally, the non-transitory machine-readable medium is configured to classify the second status of the other servers in the server cluster as either completed reclaim or pending reclaim. Responsive to classifying the second status as completed reclaim, the non-transitory machine-readable medium is configured to lift the grace period. Responsive to classifying the second status as pending reclaim, the non-transitory machine-readable medium is configured to enforce the grace period.

Aspects of the subject matter described herein may be useful alone or in combination with one or more other aspects described herein. In a 33rd exemplary aspect of the present disclosure, a system includes a means for receiving a reclaim request from a client. The server is part of a server cluster. The system also includes a means for comparing the reclaim request against a client list, a means for classifying the reclaim request as either allowed or restricted, a means for determining a first status of a grace period as either in effect or inoperative, a means for incrementing a reclaim value of a grace database to change the first status of the grace period to in effect responsive to determining the first status of the grace period as inoperative, and a means for setting a need_grace flag responsive to determining the first status of the grace period as in effect.

In a 34th exemplary aspect of the present disclosure, which may be used in combination with any one or more of the preceding aspects (e.g., the 33rd aspect), system further includes a means for executing the reclaim request, a means for clearing the need_grace flag, a means for checking a second status of other servers in the server cluster responsive to clearing the need_grace flag, a means for classifying the second status of the other servers in the server cluster as either completed reclaim or pending reclaim, a means for lifting the grace period responsive to classifying the second status as completed reclaim, and a means for enforcing the grace period responsive to classifying the second status as pending reclaim.

In a 35th exemplary aspect of the present disclosure, which may be used in combination with any one or more of the preceding aspects (e.g., the 34th aspect), the system further includes a second means for receiving a different reclaim request from a different client. The server is a first server and the different server is a second server. The system also includes a second means for determining that the first status of a grace period as in effect, and a second means for executing the different reclaim request responsive to determining the first status of the grace period as in effect.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a plurality of clustered servers, wherein each of the plurality of clustered servers maintains a respective client recovery list;
   a plurality of clients communicating with the plurality of clustered servers, wherein a client of the plurality of clients is configured to send a reclaim request to a server of the plurality of clustered servers; and
   a grace database, wherein the grace database is configured to:
      maintain an epoch value and a reclaim value, wherein
         the epoch value indicates the current epoch, and
         the reclaim value indicates from which epoch reclaim is allowed; and
   wherein the server of the plurality of clustered servers is configured to:
      maintain a client list, wherein the client list indicates each client currently holding state on the server,
      receive the reclaim request from the client,
      compare the reclaim request against the client list,
      classify the reclaim request as one of allowed and restricted,
      determine a first status of a grace period as inoperative, wherein the first status is one of in effect and inoperative, and
      responsive to determining the first status of the grace period as inoperative, increment the epoch value of the grace database to define a new current epoch.

2. The system of claim 1, wherein the server is further configured to:
   responsive to determining the first status of the grace period as inoperative, increment the reclaim value of the grace database to change the first status of the grace period to in effect; and
   execute the reclaim request.

3. The system of claim 2, wherein the server is further configured to:
   check a second status of other servers in the cluster;
   classify the second status of other servers in the server cluster as one of completed reclaim and pending reclaim;
   responsive to classifying the second status as completed reclaim, lift the grace period; and
   responsive to classifying the second status as pending reclaim, continue enforcing the grace period.

4. The system of claim 1, wherein the server is further configured to: responsive to executing the reclaim request, establish a record of the client in a new client list associated with the new current epoch.

5. The system of claim 1, wherein the server is configured to lift the grace period by setting the reclaim value in the grace database to zero.

6. The system of claim 1, wherein the client list is maintained on stable storage.

7. The system of claim 1, wherein the reclaim request indicates a reclaim epoch and a client state, the client state indicates at least one of a file, a lock, a delegation, and a layout.

8. A method comprising:
   receiving, by a server, a reclaim request from a client, wherein the server is part of a server cluster;
   comparing, by the server, the reclaim request against a client list;
   classifying, by the server, the reclaim request as one of allowed and restricted;
   determining, by the server, a first status of a grace period as inoperative, wherein the first status is one of in effect and inoperative;
   responsive to determining the first status of the grace period as inoperative, (i) incrementing, by the server, an epoch value of the grace database to define a new current epoch and (ii) changing, by the server, the first status of the grace period to in effect, wherein the epoch value indicates the current epoch;
   executing, by the server, the reclaim request; and
   responsive to executing the reclaim request, establishing, by the server, a record of the client in a new client list associated with the new current epoch.

9. The method of claim 8, further comprising:
   clearing, by the server, a need_grace flag used to signal that the server needed a reclaim period;
   responsive to clearing the need_grace flag, checking, by the server, a second status of other servers in the server cluster;
   classifying, by the server, the second status of the other servers in the server cluster as one of completed reclaim and pending reclaim;
   responsive to classifying the second status as completed reclaim, lifting, by the server, the grace period; and
   responsive to classifying the second status as pending reclaim, continue enforcing, by the server, the grace period.

10. The method of claim 8, further comprising:
receiving, by a different server in the server cluster, a different reclaim request from a different client, wherein the server is a first server and the different server is a second server;
determining, by the second server, that the first status of a grace period as in effect;
responsive to determining the first status of the grace period as in effect, executing, by the second server, the different reclaim request.

11. The method of claim 9, wherein lifting the grace period includes setting a reclaim value in the grace database to zero, and wherein the reclaim value indicates from which epoch reclaim is allowed.

12. The method of claim 11 further comprising:
responsive to lifting the grace period, legitimizing the new client list.

13. The method of claim 12 further comprising:
responsive to legitimizing the new client list, deleting, by the server, any previous client lists.

14. The method of claim 8, wherein the client list is maintained on stable storage.

15. A method comprising:
maintaining, by a database, an epoch value and a reclaim value, wherein
the epoch value indicates the current epoch, and
the reclaim value indicates from which epoch reclaim is allowed;
responsive to a server reboot, querying, by a server of a server cluster, the epoch value and the reclaim value to determine a cluster status of the cluster as one of in recovery and in normal operation;
responsive to determining the status as in recovery, allowing, by the server, a client to reclaim a previous operational state;
responsive to determining the status as in normal operation, preventing by the server, the client from reclaiming the previous operational state;
tracking, by the database, a set of flags associated with each server of the server cluster;
querying, by the server, the database for a flag status of each server;
classifying, by the server, the flag status as one of completed reclaim and pending reclaim;
responsive to classifying the flag status as completed reclaim, editing, by the server, the reclaim value in the database to change the cluster status to in normal operation; and
responsive to classifying the flag status as pending reclaim, enforcing, by the server, the grace period.

16. The method of claim 15, wherein the epoch value, the reclaim value, the set of flags associated with each server is stored as a RADOS object.

17. The method of claim 16, wherein the server modifies the RADOS object when the server at least one of edits the reclaim value in the database, sets a flag, and clears a flag.

* * * * *